US012786087B2

(12) United States Patent
Otsuka et al.

(10) Patent No.: US 12,786,087 B2
(45) Date of Patent: Nov. 3, 2026

(54) COMMUNICATION MONITORING SYSTEM BETWEEN A MASTER STATION AND A SLAVE STATION TO DETERMINE A MISSING FRAME

(71) Applicant: Mitsubishi Electric Corporation, Tokyo (JP)

(72) Inventors: Yoshihiro Otsuka, Tokyo (JP); Teruko Fujii, Tokyo (JP); Takenori Sumi, Tokyo (JP); Takahisa Yamauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 321 days.

(21) Appl. No.: 18/520,757

(22) Filed: Nov. 28, 2023

(65) Prior Publication Data

US 2024/0098005 A1 Mar. 21, 2024

Related U.S. Application Data

(63) Continuation of application No. PCT/JP2021/023620, filed on Jun. 22, 2021.

(51) Int. Cl.
*H04L 43/04* (2022.01)
*H04L 43/0829* (2022.01)
*H04W 24/08* (2009.01)

(52) U.S. Cl.
CPC .......... *H04L 43/0829* (2013.01); *H04L 43/04* (2013.01); *H04W 24/08* (2013.01)

(58) Field of Classification Search
CPC ..... H04L 43/0829; H04L 43/04; H04L 1/009; H04L 1/18; H04L 41/0631;
(Continued)

(56) References Cited

U.S. PATENT DOCUMENTS

2004/0100977 A1 5/2004 Suzuki et al.
2011/0196955 A1* 8/2011 Odaka .................... H04L 41/06 709/223
2011/0242992 A1* 10/2011 Okada ................ H04L 43/0835 370/243

(Continued)

FOREIGN PATENT DOCUMENTS

JP 2001-325160 A 11/2001
JP 2004-158903 A 6/2004

(Continued)

OTHER PUBLICATIONS

International Search Report for PCT/JP2021/023620(PCT/ISA/210) mailed on Sep. 21, 2021.

(Continued)

*Primary Examiner* — Lakeram Jangbahadur
(74) *Attorney, Agent, or Firm* — Birch, Stewart, Kolasch & Birch, LLP

(57) ABSTRACT

A master station and a slave station each communicate an individually set, fixed number of communication frames in a cyclic period. The communication frame contains, as communication information, a sequence number and a period number. The master base station and the slave base station determine, upon communication of each communication frame in a wireless manner, if there is a missing communication frame on a basis of the communication information of a this-time communication frame and the communication information of a last-time communication frame. When there is a missing communication frame, a history management server records communication history information of the last-time communication frame and of the this-time communication frame, as preceding/succeeding history information.

13 Claims, 23 Drawing Sheets

(58) Field of Classification Search
CPC ..... H04L 2001/0093; H04L 2001/0097; H04L 12/44; H04L 41/0604; H04W 24/08; H04W 24/04; H04W 24/00; H04W 84/12
See application file for complete search history.

(56) References Cited

U.S. PATENT DOCUMENTS

| | | | | |
|---|---|---|---|---|
| 2012/0287841 | A1* | 11/2012 | Takahashi ........... | H04W 56/001 370/312 |
| 2014/0334375 | A1* | 11/2014 | Sugitani ................ | H04L 1/1835 370/315 |
| 2017/0093673 | A1 | 3/2017 | Shibuya et al. | |
| 2019/0229982 | A1 | 7/2019 | Ikuta et al. | |
| 2022/0150905 | A1 | 5/2022 | Shimezawa et al. | |

FOREIGN PATENT DOCUMENTS

| | | | |
|---|---|---|---|
| JP | 2009-44300 | A | 2/2009 |
| JP | 2010-233192 | A | 10/2010 |
| JP | 2011-223066 | A | 11/2011 |
| JP | 2017-63273 | A | 3/2017 |
| JP | 2019-129408 | A | 8/2019 |
| JP | 2020-57908 | A | 4/2020 |
| WO | WO 2019/229917 | A1 | 12/2019 |
| WO | WO 2020/200685 | A1 | 10/2020 |

OTHER PUBLICATIONS

Korean Office Action for Korean Application No. 10-2023-7043376, dated Oct. 24, 2024, with English translation.

Extended European Search Report for European Application No. 21947046.5, dated Apr. 16, 2024.

Korean Office Action for Korean Application No. 10-2023-7043376, dated Apr. 18, 2024, with English translation.

Indian Office Action and Search Report for Indian Application No. 202347085943, dated Nov. 25, 2025, with English translation.

Chinese Office Action and Search Report for Chinese Application No. 202180099415.7, dated Mar. 17, 2026, with English translation.

* cited by examiner

Fig.9

220: MONITORING TABLE 221 222 223 224 225 226 227

| No. | COMMUNICATION TYPE | TRANSMISSION SOURCE ADDRESS | DESTINATION ADDRESS | FINAL NUMBER | COMMUNICATION TIME POINT | PERIOD NUMBER | SEQUENCE NUMBER |
|---|---|---|---|---|---|---|---|
| 1 | 1 | 11:···:01 | ··· | 35 | | | |
| 2 | 1 | 11:···:02 | ··· | 2 | | | |
| 3 | 1 | 11:···:11 | ··· | 5 | | | |
| 4 | 0 | 11:···:22 | ··· | 9 | | | |
| 5 | 0 | 11:···:33 | ··· | 29 | | | |
| : | : | : | : | : | : | : | : |

Fig.10

| CONDITION IDENTIFIER | MISSING DETERMINING CONDITION |
|---|---|
| CONDITION (1) | THIS-TIME PERIOD NUMBER IS THE SAME AS LAST-TIME PERIOD NUMBER |
| | THIS-TIME SEQUENCE NUMBER IS LARGER THAN LAST-TIME SEQUENCE NUMBER BY 2 OR MORE |
| CONDITION (2) | THIS-TIME PERIOD NUMBER IS LARGER THAN LAST-TIME PERIOD NUMBER BY 2 OR MORE |
| CONDITION (3) | THIS-TIME PERIOD NUMBER IS LARGER THAN LAST-TIME PERIOD NUMBER BY 1 |
| | LAST-TIME SEQUENCE NUMBER IS SMALLER THAN FINAL NUMBER |
| CONDITION (4) | THIS-TIME PERIOD NUMBER IS LARGER THAN LAST-TIME PERIOD NUMBER BY 1 |
| | THIS-TIME SEQUENCE NUMBER IS NOT TOP NUMBER |
| CONDITION (5) | LAST-TIME PERIOD NUMBER IS MAXIMUM NUMBER |
| | THIS-TIME PERIOD NUMBER IS NEITHER MAXIMUM NUMBER NOR MINIMUM NUMBER |
| CONDITION (6) | LAST-TIME PERIOD NUMBER IS MAXIMUM NUMBER |
| | THIS-TIME PERIOD NUMBER IS MINIMUM NUMBER |
| | LAST-TIME SEQUENCE NUMBER IS SMALLER THAN FINAL NUMBER |
| CONDITION (7) | LAST-TIME PERIOD NUMBER IS MAXIMUM NUMBER |
| | THIS-TIME PERIOD NUMBER IS MINIMUM NUMBER |
| | LAST-TIME SEQUENCE NUMBER IS FINAL NUMBER |
| | THIS-TIME SEQUENCE NUMBER IS NOT TOP NUMBER |

Fig.15

| UNICAST TRANSMISSION FROM SLAVE STATION TO MASTER STATION | | |
|---|---|---|
| CAUSE DETERMINING CONDITION | | FAILURE CAUSE |
| CONDITION (A) | RELEVANT BASE STATION IS SLAVE BASE STATION | SLAVE STATION OR WIRED COMMUNICATION PATH |
| | RELEVANT COMMUNICATION TYPE IS "TRANSMISSION" | |
| | RELEVANT DESTINATION ADDRESS IS UNICAST ADDRESS | |
| | CORRESPONDING HISTORY INFORMATION [A] EXISTS | |
| CONDITION (B) | RELEVANT BASE STATION IS MASTER BASE STATION | WIRELESS TRANSMISSION |
| | RELEVANT COMMUNICATION TYPE IS "RECEPTION" | |
| | RELEVANT DESTINATION ADDRESS IS UNICAST ADDRESS | |
| | NO CORRESPONDING HISTORY INFORMATION [B] | |

Fig.16

| UNICAST TRANSMISSION FROM MASTER STATION TO SLAVE STATION | | |
|---|---|---|
| CAUSE DETERMINING CONDITION | | FAILURE CAUSE |
| CONDITION (C) | RELEVANT BASE STATION IS SLAVE BASE STATION | MASTER STATION OR WIRED COMMUNICATION PATH |
| | RELEVANT COMMUNICATION TYPE IS "RECEPTION" | |
| | RELEVANT DESTINATION ADDRESS IS UNICAST ADDRESS | |
| | CORRESPONDING HISTORY INFORMATION [C] EXISTS | |
| CONDITION (D) | RELEVANT BASE STATION IS SLAVE BASE STATION | WIRELESS TRANSMISSION |
| | RELEVANT COMMUNICATION TYPE IS "RECEPTION" | |
| | RELEVANT DESTINATION ADDRESS IS UNICAST ADDRESS | |
| | NO CORRESPONDING HISTORY INFORMATION [D] | |

Fig.17

| UNICAST TRANSMISSION BETWEEN SLAVE STATIONS VIA WIRELESS COMMUNICATION | | |
|---|---|---|
| CAUSE DETERMINING CONDITION | | FAILURE CAUSE |
| CONDITION (E) | RELEVANT BASE STATION IS SLAVE BASE STATION | SLAVE STATION OR WIRED COMMUNICATION PATH |
| | RELEVANT COMMUNICATION TYPE IS "TRANSMISSION" | |
| | RELEVANT DESTINATION ADDRESS IS UNICAST ADDRESS | |
| | CORRESPONDING HISTORY INFORMATION [E] EXISTS | |
| CONDITION (F) | RELEVANT BASE STATION IS SLAVE BASE STATION | WIRELESS TRANSMISSION |
| | RELEVANT COMMUNICATION TYPE IS "RECEPTION" | |
| | RELEVANT DESTINATION ADDRESS IS UNICAST ADDRESS | |
| | NO CORRESPONDING HISTORY INFORMATION [F], OR CORRESPONDING HISTORY INFORMATION [F'] EXISTS | |
| CONDITION (G) | RELEVANT BASE STATION IS SLAVE BASE STATION | WIRELESS TRANSMISSION |
| | RELEVANT COMMUNICATION TYPE IS "RECEPTION" | |
| | RELEVANT DESTINATION ADDRESS IS UNICAST ADDRESS | |
| | NO CORRESPONDING HISTORY INFORMATION [G], OR NO CORRESPONDING HISTORY INFORMATION [G'] | |

Fig.18

| MULTICAST TRANSMISSION FROM SLAVE STATION TO PLURALITY OF STATIONS | | |
|---|---|---|
| CAUSE DETERMINING CONDITION | | FAILURE CAUSE |
| CONDITION (H) | RELEVANT BASE STATION IS SLAVE BASE STATION | SLAVE STATION OR WIRED COMMUNICATION PATH |
| | RELEVANT COMMUNICATION TYPE IS "TRANSMISSION" | |
| | RELEVANT DESTINATION ADDRESS IS MULTICAST ADDRESS | |
| | CORRESPONDING HISTORY INFORMATION [H] EXISTS | |
| CONDITION (I) | RELEVANT BASE STATION IS MASTER BASE STATION | WIRELESS TRANSMISSION |
| | RELEVANT COMMUNICATION TYPE IS "RECEPTION" | |
| | RELEVANT DESTINATION ADDRESS IS MULTICAST ADDRESS | |
| | NO CORRESPONDING HISTORY INFORMATION [I] | |
| CONDITION (J) | RELEVANT BASE STATION IS SLAVE BASE STATION | WIRELESS TRANSMISSION |
| | RELEVANT COMMUNICATION TYPE IS "RECEPTION" | |
| | RELEVANT DESTINATION ADDRESS IS MULTICAST ADDRESS | |
| | NO CORRESPONDING HISTORY INFORMATION [J], [J'] | |

Fig.19

| MULTICAST TRANSMISSION FROM MASTER STATION TO PLURALITY OF STATIONS | | |
|---|---|---|
| CAUSE DETERMINING CONDITION | | FAILURE CAUSE |
| CONDITION (K) | RELEVANT BASE STATION IS MASTER BASE STATION | MASTER STATION OR WIRED COMMUNICATION PATH |
| | RELEVANT COMMUNICATION TYPE IS "TRANSMISSION" | |
| | RELEVANT DESTINATION ADDRESS IS MULTICAST ADDRESS | |
| | CORRESPONDING HISTORY INFORMATION [K] OF EACH OF ALL PARTNER SLAVE BASE STATIONS EXISTS | |
| CONDITION (L) | RELEVANT BASE STATION IS SLAVE BASE STATION | WIRELESS TRANSMISSION |
| | RELEVANT COMMUNICATION TYPE IS "RECEPTION" | |
| | RELEVANT DESTINATION ADDRESS IS MULTICAST ADDRESS | |
| | NO CORRESPONDING HISTORY INFORMATION [L] | |

Fig.20

| BROADCAST TRANSMISSION FROM SLAVE STATION | | |
|---|---|---|
| CAUSE DETERMINING CONDITION | | FAILURE CAUSE |
| CONDITION (M) | RELEVANT BASE STATION IS SLAVE BASE STATION | SLAVE STATION OR WIRED COMMUNICATION PATH |
| | RELEVANT COMMUNICATION TYPE IS "TRANSMISSION" | |
| | RELEVANT DESTINATION ADDRESS IS BROADCAST ADDRESS | |
| | CORRESPONDING HISTORY INFORMATION [M] EXISTS | |
| CONDITION (N) | RELEVANT BASE STATION IS MASTER BASE STATION | WIRELESS TRANSMISSION |
| | RELEVANT COMMUNICATION TYPE IS "RECEPTION" | |
| | RRELEVANT DESTINATION ADDRESS IS BROADCAST ADDRESS | |
| | NO CORRESPONDING HISTORY INFORMATION [N] | |
| CONDITION (O) | RELEVANT BASE STATION IS SLAVE BASE STATION | WIRELESS TRANSMISSION |
| | RELEVANT COMMUNICATION TYPE IS "RECEPTION" | |
| | RELEVANT DESTINATION ADDRESS IS BROADCAST ADDRESS | |
| | NO CORRESPONDING HISTORY INFORMATION [O], [O'] | |

Fig.21

| BROADCAST TRANSMISSION FROM MASTER STATION | | |
|---|---|---|
| CAUSE DETERMINING CONDITION | | FAILURE CAUSE |
| CONDITION (P) | RELEVANT BASE STATION IS MASTER BASE STATION | MASTER STATION OR WIRED COMMUNICATION PATH |
| | RELEVANT COMMUNICATION TYPE IS "TRANSMISSION" | |
| | RELEVANT DESTINATION ADDRESS IS BROADCAST ADDRESS | |
| | CORRESPONDING HISTORY INFORMATION [P] EXISTS | |
| CONDITION (Q) | RELEVANT BASE STATION IS SLAVE BASE STATION | WIRELESS TRANSMISSION |
| | RELEVANT COMMUNICATION TYPE IS "RECEPTION" | |
| | RELEVANT DESTINATION ADDRESS IS BROADCAST ADDRESS | |
| | NO CORRESPONDING HISTORY INFORMATION [Q] | |

COMMUNICATION MONITORING SYSTEM BETWEEN A MASTER STATION AND A SLAVE STATION TO DETERMINE A MISSING FRAME

CROSS REFERENCE TO RELATED APPLICATION

This application is a Continuation of PCT International Application No. PCT/JP2021/023620, filed on Jun. 22, 2021, which is hereby expressly incorporated by reference into the present application.

TECHNICAL FIELD

The present disclosure relates to a system that monitors cyclic data transfer.

BACKGROUND ART

A large number of devices are connected to a network, and inter-device communication is performed in some communication section via relay by transmission devices.

In a communication section sandwiched between two transmission devices, the transmission-side transmission device and the reception-side transmission device individually store communication histories of relayed frames. By comparing and analyzing these communication histories, a communication failure in the communication section is detected.

Patent Literature 1 discloses that failure detection is performed based on whether or not the same frame has passed between the transmission-side transmission device and the reception-side transmission device.

CITATION LIST

Patent Literature

Patent Literature 1: JP 2020-057908 A

SUMMARY OF INVENTION

Technical Problem

However, to detect a communication failure, the transmission-side transmission device and the reception-side transmission device are required to individually store the communication histories of all relayed frames. Therefore, a storage amount of the communication histories becomes enormous.

An objective of the present disclosure is to enable communication failure analysis without enormously increasing the storage amount of the communication histories.

Solution to Problem

A communication monitoring system according to the present disclosure includes:

a master base station connected to a master station in a wired manner;

a slave base station connected to a slave station in the wired manner to communicate a communication frame communicated between the master station and the slave station to the master base station in a wireless manner; and a history management server to record, as preceding/succeeding history information, communication history information of a communication frame communicated by each of the master base station and the slave base station before and after a missing communication frame, wherein the master station and the slave station each communicate an individually set, fixed number of communication frames in a cyclic period, wherein the communication frame contains, as communication information, a sequence number and a period number, the sequence number indicating an order in the cyclic period, the period number incrementing each time the cyclic period passes, and wherein the master base station and the slave base station determine, upon communication of each communication frame in the wireless manner, if there is a missing communication frame on a basis of the communication information of a this-time communication frame and the communication information of a last-time communication frame, and when there is a missing communication frame, transmit communication history information of the last-time communication frame and of the this-time communication frame to the history management server, as the preceding/succeeding history information.

Advantageous Effects of Invention

According to the present disclosure, not all communication history information but only preceding/succeeding history information is recorded, so the storage amount of the communication history does not become enormous. In addition, since the preceding/succeeding history information of the master base station and the preceding/succeeding history information of the slave base station are recorded, it is possible to analyze a communication failure.

BRIEF DESCRIPTION OF DRAWINGS

FIG. 9 is a configuration diagram of a monitoring table 220 in Embodiment 1.

FIG. 10 is a diagram illustrating missing determining conditions in Embodiment 1.

FIG. 15 is a diagram illustrating cause determining conditions (A) and (B) in Embodiment 1.

FIG. 16 is a diagram illustrating cause determining conditions (C) and (D) in Embodiment 1.

FIG. 17 is a diagram illustrating cause determining conditions (E), (F), and (G) in Embodiment 1.

FIG. 18 is a diagram illustrating cause determining conditions (H), (I), and (J) in Embodiment 1.

FIG. 19 is a diagram illustrating cause determining conditions (K) and (L) in Embodiment 1.

FIG. 20 is a diagram illustrating cause determining conditions (M), (N), and (O) in Embodiment 1.

FIG. 21 is a diagram illustrating cause determining conditions (P) and (Q) in Embodiment 1.

DESCRIPTION OF EMBODIMENTS

Figure 1:
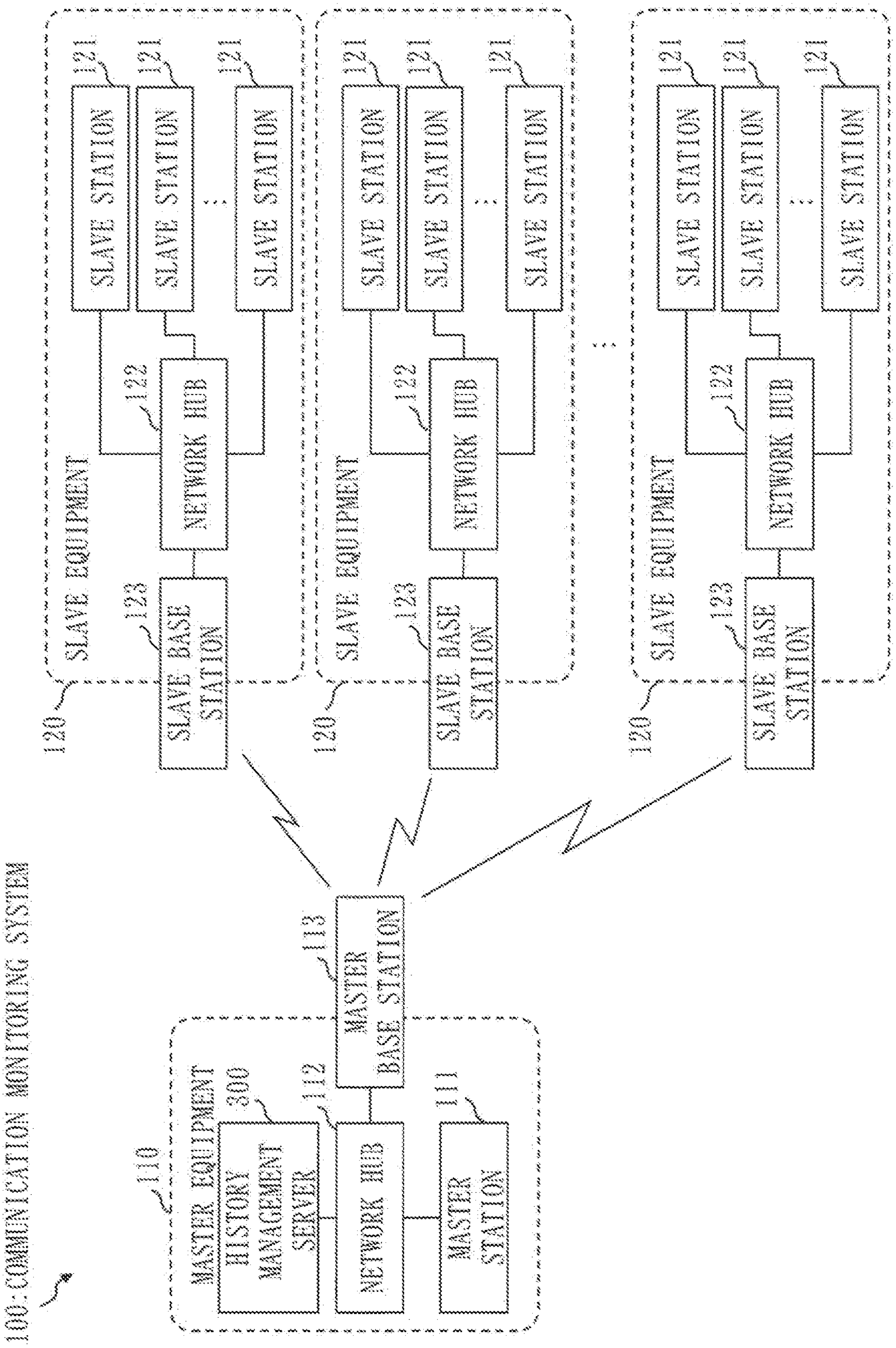
FIG. 1 is a configuration diagram of a communication monitoring system 100 in Embodiment 1.

In the embodiment and drawings, the same elements or the equivalent elements are denoted by the same reference sign. Description of an element denoted by the same reference sign as that of a described element will be appropriately omitted or simplified. Arrows in the drawings mainly indicate data flows or process flows.

Embodiment 1

A communication monitoring system 100 will be described with referring to FIG. 1 to FIG. 23.

Description of Configurations

A configuration of the communication monitoring system 100 will be described with referring to FIG. 1.

The communication monitoring system 100 is a system to monitor communication between a master station 111 and slave stations 121 and communication between the slave stations 121.

For example, the master station 111 and the slave stations 121 are connected in CC-Link IE TSN with using wired connection and wireless connection.

Note that TSN stands for Time Sensitive Networking.

The communication monitoring system 100 is provided with a master equipment 110 and one or more slave equipments 120.

The master equipment 110 is an equipment provided with the master station 111.

The slave equipment 120 is an equipment provided with one or more slave stations 121.

The master equipment 110 is provided with the master station 111, a network hub 112, a master base station 113, and a history management server 300.

The master station 111 is a device that executes various processes while communicating with the slave stations 121. The master station 111 is constituted using, for example, a computer. The master station 111 is connected to the master base station 113 in a wired manner via the network hub 112.

The history management server 300 is a server that manages communication histories. The history management server 300 is connected to the master base station 113 in the wired manner via the network hub 112.

The master base station 113 is a communication device that performs communication in the wired manner and in a wireless manner. The master base station 113 communicates with each of the master station 111 and the history management server 300 in the wired manner, and communicates with a slave base station 123 of each slave equipment 120 in the wireless manner.

The slave equipment 120 is provided with one or more slave stations 121, a network hub 122, and a slave base station 123.

The slave station 121 is a device that executes various processes while communicating with the master station 111. The slave station 121 is constituted using, for example, a computer. The slave station 121 is connected to the slave base station 123 in the wired manner via the network hub 122.

The slave base station 123 is a communication device that performs communication in the wired manner and in the wireless manner. The slave base station 123 communicates with each slave station 121 in the wired manner and communicates with the master base station 113 in the wireless manner.

The master base station 113 and the slave base stations 123 function as transmission devices that transmit frames communicated between the master station 111 and the slave stations 121 in the wired manner and in the wireless manner. The transmission devices are also called transfer devices or relay devices.

If communication takes place between two slave stations 121 provided to different slave equipments 120, wireless communication between the two slave base stations 123 is performed via the master base station 113.

The master station 111 and each slave station 121 perform cyclic data transfer in synchronism with a cyclic period. Cyclic data transfer is also called cyclic communication.

For example, cyclic data transfer is performed to control each slave station 121.

The frame transmitted by cyclic data transfer is called "communication frame 130". The communication frame 130 is also called cyclic data transfer frame.

In cyclic data transfer, the master station 111 and each slave station 121 communicate an individually set, fixed number of communication frames 130 in the cyclic period. The cyclic period is a predetermined fixed time duration.

Figure 2:
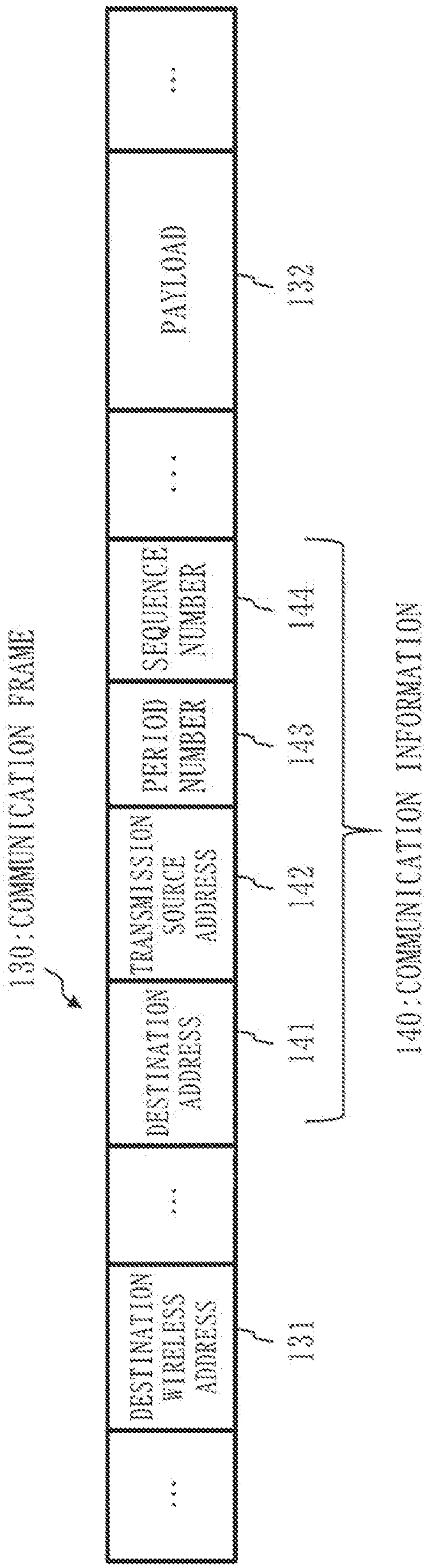
FIG. 2 is a configuration diagram of a communication frame 130 in Embodiment 1.

A configuration of the communication frame 130 will be described with referring to FIG. 2. Note that an arrangement of the elements of the communication frame 130 may be different from the arrangement illustrated in FIG. 2.

The communication frame 130 contains a destination wireless address 131, communication information 140, and a payload 132.

The destination wireless address 131 is a wireless communication address of a base station 200 connected to the destination of the communication frame 130 in the wired manner.

The communication information 140 contains a destination address 141, a transmission source address 142, a period number 143, and a sequence number 144.

The destination address 141 is the address of a destination of the communication frame 130.

The transmission source address 142 is the address of a transmission source of the communication frame 130.

The period number 143 is a number that increments each time a cyclic period passes. The period number 143 is also called cyclic period number.

The period number 143 starts with a minimum number that is an initial value, ends with a maximum number that is a maximum value, and after reaching the maximum number, returns to the minimum number.

The period number 143 is the same in the master station 111 and in each slave station 121. That is, the master station 111 and each slave station 121 use the same period number "n" in the same time zone, and use the same period number "n+1" in the next time zone.

The sequence number 144 is a number that indicates an order in the cyclic period.

The sequence number 144 increments each time a communication frame 130 is transmitted.

The sequence number 144 starts with a top number that is an initial value, ends with a final number that is a maximum value, and each time a cyclic period passes, returns to the top number.

The maximum value of the sequence number 144 corresponds to a number of communication frames 130 transmitted within the cyclic period. The maximum value of the sequence number 144 is constant in the master station 111, and is constant in each slave station 121.

The sequence number 144 (and the maximum value) is (are) set separately in the master station 111 and in each slave station 121.

Figure 3:
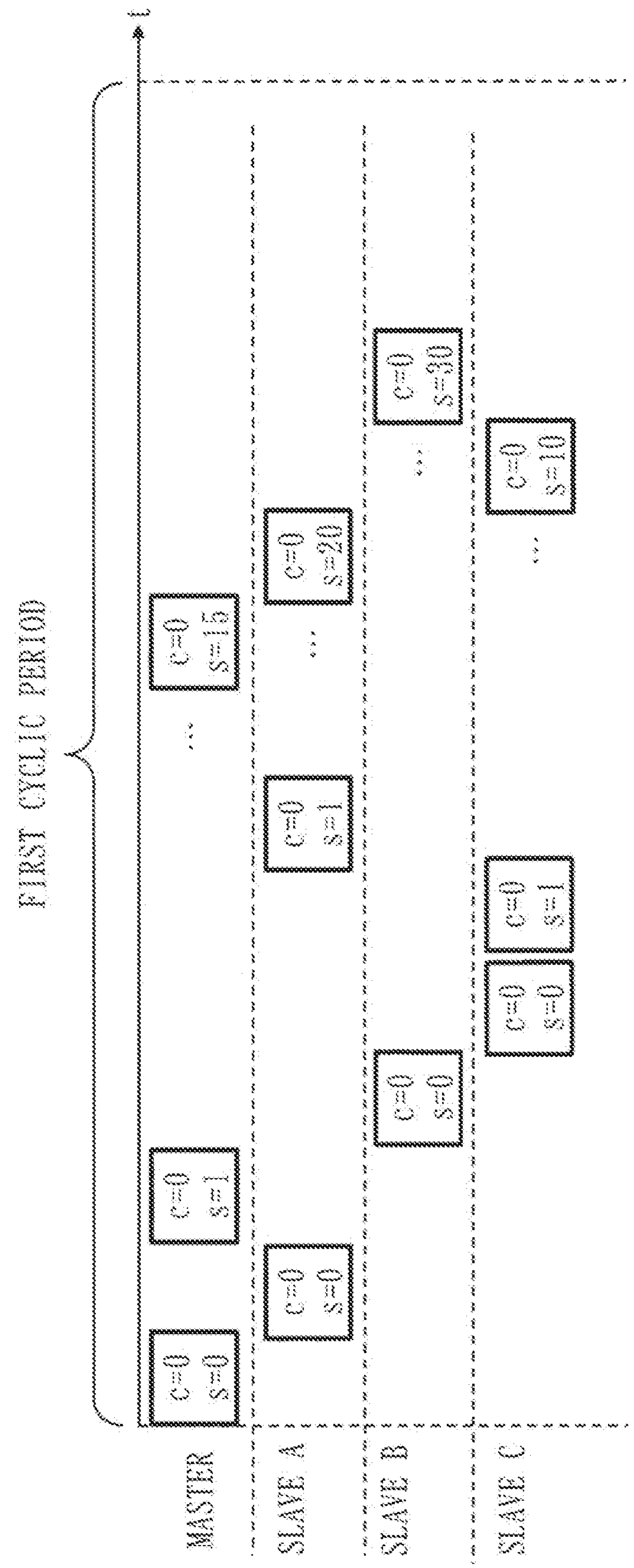
FIG. 3 is a diagram illustrating examples of a period number 143 and examples of a sequence number 144 in Embodiment 1.
Figure 4:
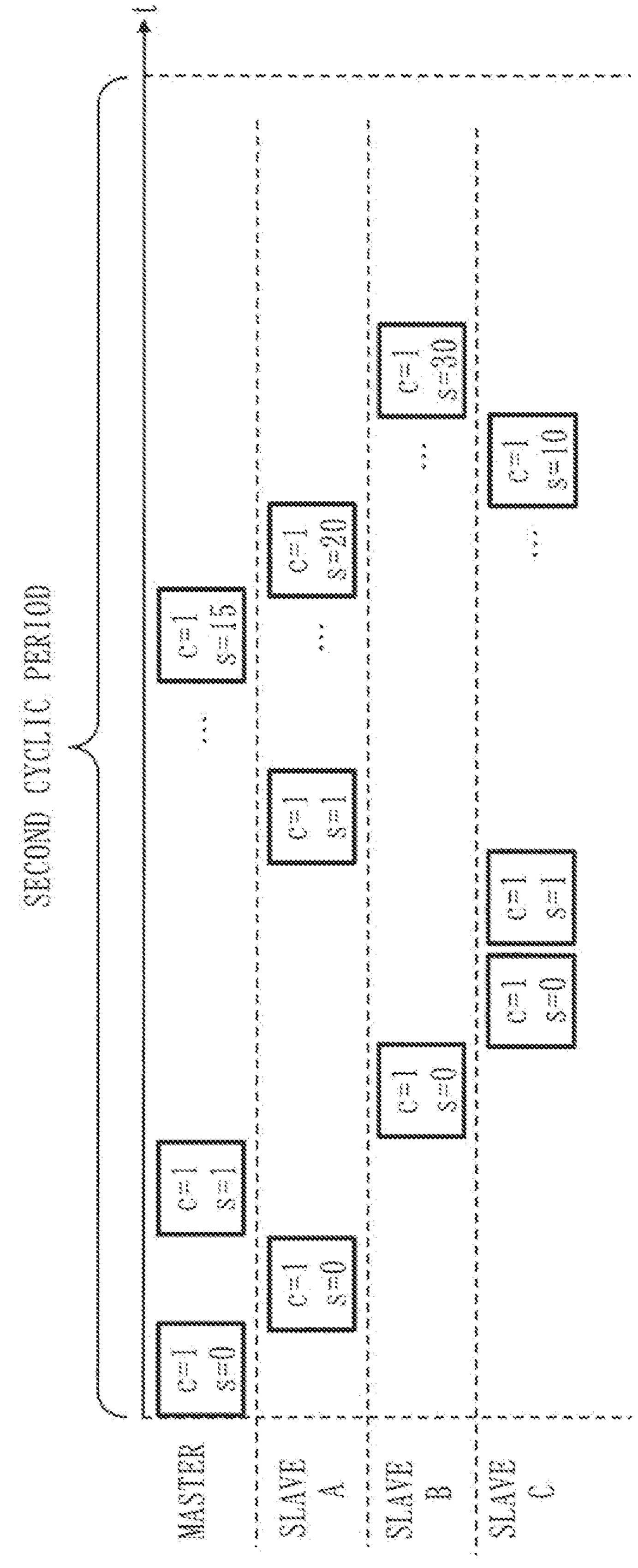
FIG. 4 is a diagram illustrating examples of the period number 143 and examples of the sequence number 144 in Embodiment 1.
Figure 5:
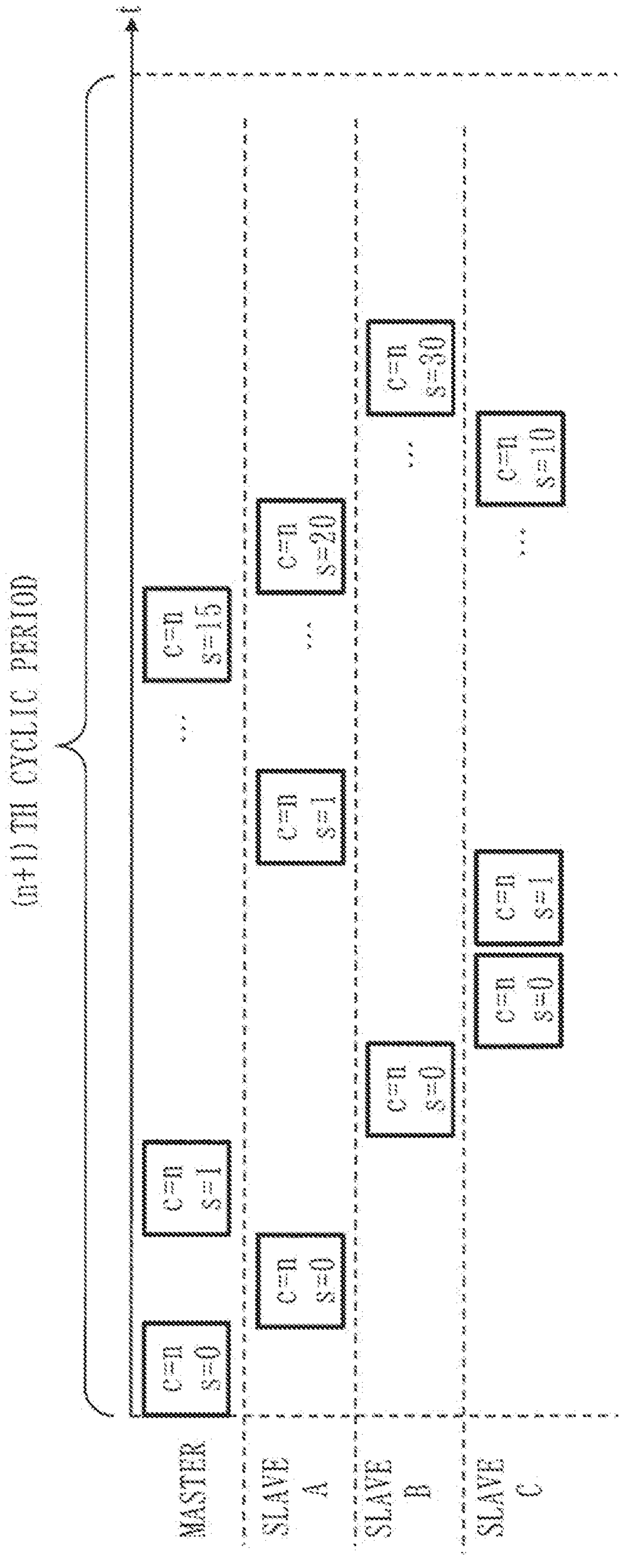
FIG. 5 is a diagram illustrating examples of the period number 143 and examples of the sequence number 144 in Embodiment 1.

Specific examples of the period number 143 and specific examples of the sequence number 144 will be described with referring to FIGS. 3 to 5. FIG. 3 illustrates specific examples in a first cyclic period. FIG. 4 illustrates specific examples in a second cyclic period. FIG. 5 illustrates specific examples in an (n+1)th cyclic period.

Note that "master" expresses the master station 111. Note that "slave A", "slave B", and "slave C" express three slave stations 121.

Each square expresses a communication frame 130. Note that "c" expresses period number 143, and that "s" expresses sequence number 144.

In the first cyclic period, the period numbers 143 of all communication frames 130 transmitted from the master and the three slaves are "0".

In the second cyclic period, the period numbers 143 of all communication frames 130 transmitted from the master and the three slaves are "1".

In the (n+1)th cyclic period, the period numbers 143 of all communication frames 130 transmitted from the master and the three slaves are "n".

In each cyclic period, the sequence number 144 of the first communication frame 130 transmitted from the master is "0", and the sequence number 144 of the first communication frame 130 transmitted from each slave is "0".

In each cyclic period, the master transmits 16 pieces of communication frames 130, and the sequence number 144 increments from "0" until "15". The slave A transmits 21 pieces of communication frames 130, and the sequence number 144 increments from "0" until "20". The slave B transmits 31 pieces of communication frames 130, and the sequence number 144 increments from "0" until "30". The slave C transmits 11 pieces of communication frames 130, and the sequence number 144 increments from "0" until "10".

If the master base station 113 and the slave base station 123 are not to be distinguished, they are each called base station 200.

Figure 6:
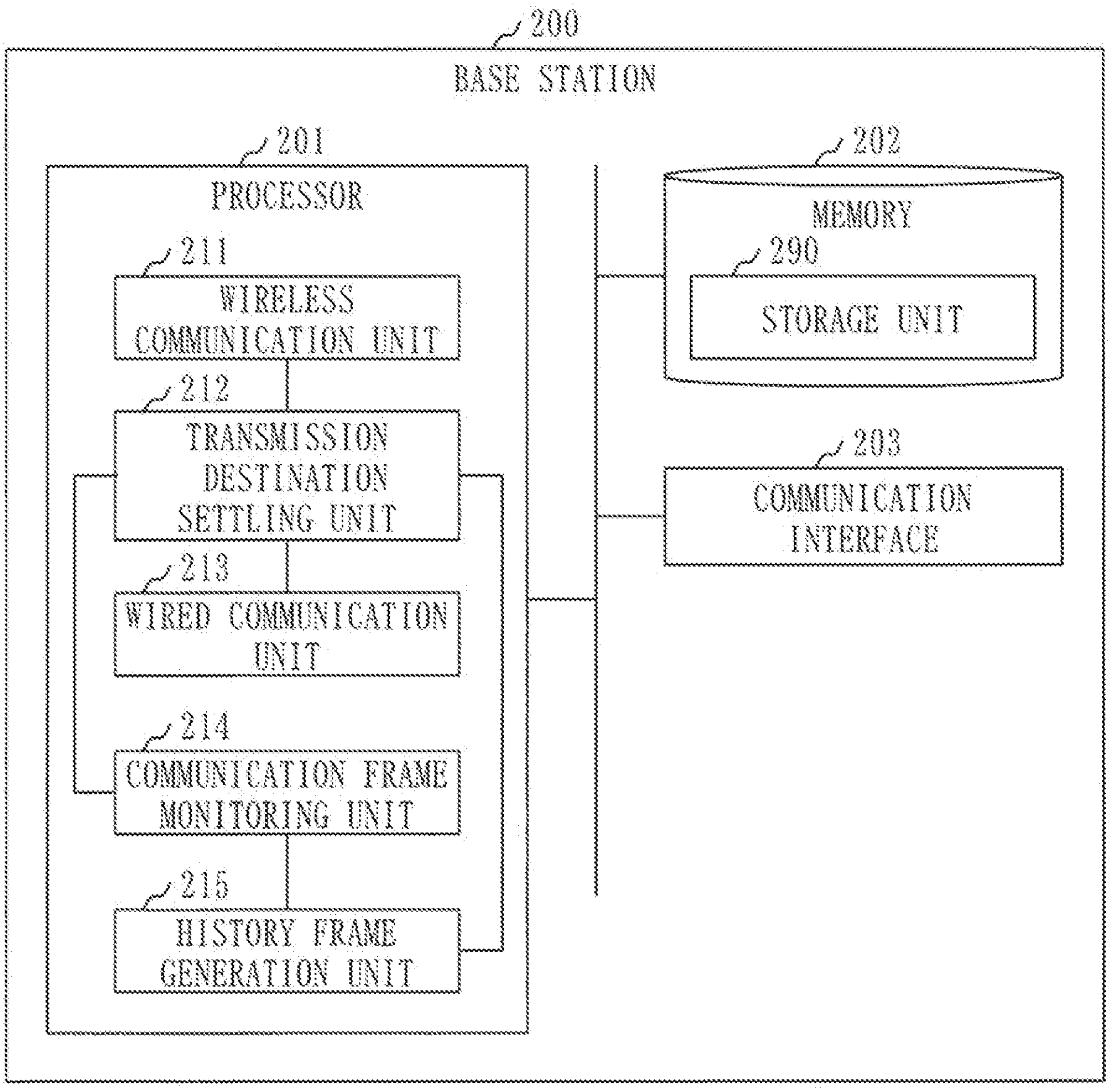
FIG. 6 is a configuration diagram of a base station 200 in Embodiment 1.

A configuration of the base station 200 will be described with referring to FIG. 6.

The base station 200 is a computer provided with hardware devices such as a processor 201, a memory 202, and a communication interface 203. These hardware devices are connected to each other via a signal line.

The processor 201 is an IC to perform computation processing, and controls the other hardware devices. For example, the processor 201 is a CPU.

Note that IC stands for Integrated Circuit.

Note that CPU stands for Central Processing Unit.

The memory 202 is a storage device. The memory 202 is also called main storage device or main memory. For example, the memory 202 is a RAM or a flash memory.

Note that RAM stands for Random-Access Memory.

The communication interface 203 functions as a receiver/transmitter. For example, the communication interface 203 is a communication chip or an NIC. The base station 200 performs communication with using the communication interface 203.

Note that NIC stands for Network Interface Card.

The base station 2(*x*) is provided with elements such as a wireless communication unit 211, a transmission destination settling unit 212, a wired communication unit 213, a communication frame monitoring unit 214, and a history frame generation unit 215. These elements are implemented by software.

In the memory 202 is stored a base station program that causes the computer to function as the wireless communication unit 211, the transmission destination settling unit 212, the wired communication unit 213, the communication frame monitoring unit 214, and the history frame generation unit 215.

Further, an OS is stored in the memory 202. The processor 201 runs the base station program while running the OS.

Note that OS stands for Operating System.

Input/output data of the base station program is stored in a storage unit 290. For example, an address table, a configuration file, and so on are stored in the storage unit 290. The address table shows addresses of the master station 111, the slave station 121, the master base station 113, the slave base station 123, and the history management server 300. The configuration file shows connection relationships among the master station 111, the slave station 121, the master base station 113, the slave base station 123, and the history management server 300 with each other.

The memory 202 functions as the storage unit 290. Instead of the memory 202 or together with the memory 202, a storage device such as a register in the processor 201 and a cache memory in the processor 201 may function as the storage unit 290.

The base station 200 may be provided with a plurality of processors that substitute for the processor 201.

The base station program can be computer-readably recorded (stored) in a nonvolatile recording medium such as an optical disk and a flash memory.

Figure 7:
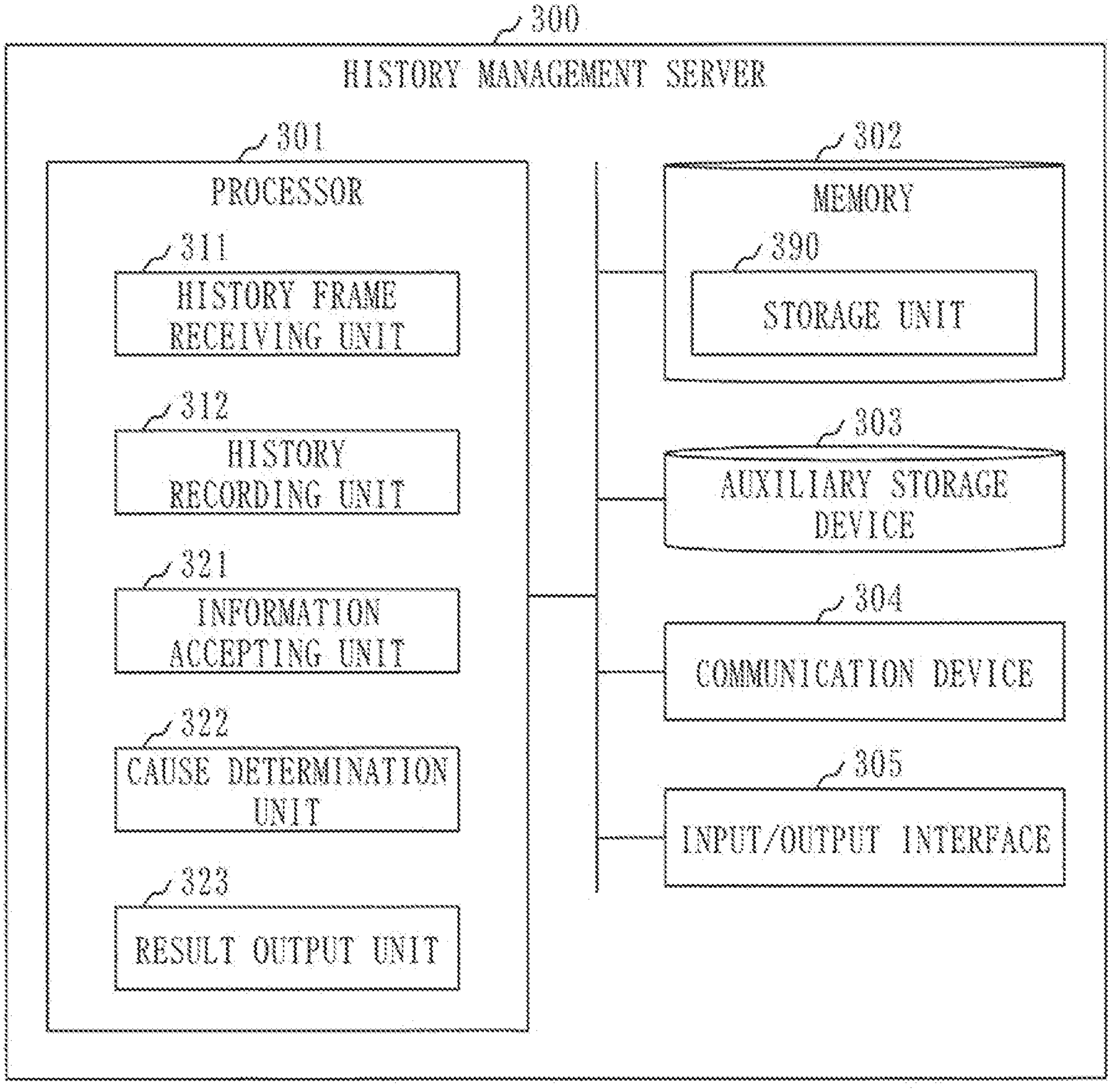
FIG. 7 is a configuration diagram of a history management server 300 in Embodiment 1.

A configuration of the history management server 300 will be described with referring to FIG. 7.

The history management server 300 is a computer provided with hardware devices such as a processor 301, a memory 302, an auxiliary storage device 303, a communication device 304, and an input/output interface 305. These hardware devices are connected to each other via a signal line.

The processor 301 is an IC to perform computation processing, and controls the other hardware devices. For example, the processor 301 is a CPU.

The memory 302 is a volatile or nonvolatile storage device. The memory 302 is also called main storage device or main memory. For example, the memory 302 is a RAM.

Data stored in the memory 302 is saved in the auxiliary storage device 303 as necessary.

Note that RAM stands for Random-Access Memory.

The auxiliary storage device 303 is a nonvolatile storage device. For example, the auxiliary storage device 303 is one or a combination of a ROM, an HDD, and a flash memory. Data stored in the auxiliary storage device 303 is loaded to the memory 302 as necessary.

Note that ROM stands for Read-Only Memory.

Note that HDD stands for Hard Disk Drive.

The communication device 304 is a receiver/transmitter. For example, the communication device 304 is a communication chip or an NIC. The history management server 300 performs communication with using the auxiliary storage device 303.

The input/output interface 305 is a port to which an input device and an output device are connected. For example, the input/output interface 305 is a USB terminal, the input device is a keyboard/mouse, and the output device is a display. The history management server 300 performs input/output with using the input/output interface 305.

Note that USB stands for Universal Serial Bus.

The history management server 300 is provided with elements such as a history frame receiving unit 311, a history recording unit 312, an information accepting unit 321, a cause determination unit 322, and a result output unit 323. These elements are implemented by software.

In the auxiliary storage device 303 is stored a history management program which causes the computer to function as the history frame receiving unit 311, the history recording unit 312, the information accepting unit 321, the cause determination unit 322, and the result output unit 323. The history management program is loaded to the memory 302 and run by the processor 301.

Further, an OS is stored in the auxiliary storage device 303. At least part of the OS is loaded to the memory 302 and run by the processor 301.

The processor 301 runs the history management program while running the OS.

Input/output data of the history management program is stored in a storage unit 390. For example, an address table, a configuration file, and so on are stored in the storage unit 390.

The memory 302 functions as the storage unit 390. Instead of the memory 302 or together with the memory 302, a storage device such as the auxiliary storage device 303, a register in the processor 301, and a cache memory in the processor 301 may function as the storage unit 390.

The history management server 300 may be provided with a plurality of processors that substitute for the processor 301.

The history management program can be computer-readably recorded (stored) in a nonvolatile recording medium such as an optical disk and a flash memory.

Description of Operations

An operation procedure of the communication monitoring system 100 corresponds to a communication monitoring method. The operation procedure of the communication monitoring system 100 also corresponds to a processing procedure executed by a communication monitoring program. The communication monitoring program includes a base station program and a history management program.

The communication monitoring method (reception) will be described with referring to FIG. 8.

The communication monitoring method (reception) is a method for a case where the base station 200 has received a communication frame 130.

In step S101, the wireless communication unit 211 receives the communication frame 130 in the wireless manner and passes the communication frame 130 to the transmission destination settling unit 212.

The transmission destination settling unit 212 accepts the communication frame 130 and passes the communication frame 130 to the wired communication unit 213 and the communication frame monitoring unit 214. The destination wireless address 131 may be deleted from the communication frame 130.

After step S101, the processing advances to step S102 and step S103.

In step S102, the wired communication unit 213 accepts the communication frame 130 and transmits the communication frame 130 in the wired manner.

Specifically, if the base station 200 is a slave base station 123, the wired communication unit 213 transmits the communication frame 130 to the slave station 121 identified by the destination address 141 of the communication frame 130.

If the base station 200 is the master base station 113, the wired communication unit 213 transmits the communication frame 130 to the master station 111.

In step S103, the communication frame monitoring unit 214 accepts the communication frame 130 and searches a monitoring table 220 by using the destination address 141 and the transmission source address 142 as search keys.

The monitoring table 220 will be described with referring to FIG. 9. FIG. 9 illustrates an example of the monitoring table 220 in an initial state.

The monitoring table 220 is stored in the storage unit 290 in advance.

The monitoring table 220 shows a final number 224, a communication time point 225, a period number 226, and a sequence number 227 per set of communication type 221, transmission source address 222, and destination address 223.

Items of the communication type 221 through the sequence number 227 will be referred to as "monitor information".

The communication type 221 is the type of wireless communication and shows "transmission" or "reception". Note that "1" signifies "reception" and "0" signifies "transmission".

The transmission source address 222 identifies a transmission source of the communication frame 130.

The destination address 223 identifies a destination of the communication frame 130.

The final number 224 is a maximum value of the period number 143 in the transmission source of the communication frame 130.

The communication time point 225 is a time point at which the communication frame 130 was communicated in the wireless manner.

The period number 226 is the period number 143 of the communication frame 130.

The sequence number 227 is the sequence number 144 of the communication frame 130.

The transmission source address 222 and the destination address 223 are specifically MAC addresses.

Note that MAC stands for Media Access Control address.

The communication type 221, the transmission source address 222, the destination address 223, and the final number 224 are set in advance.

Figure 8:
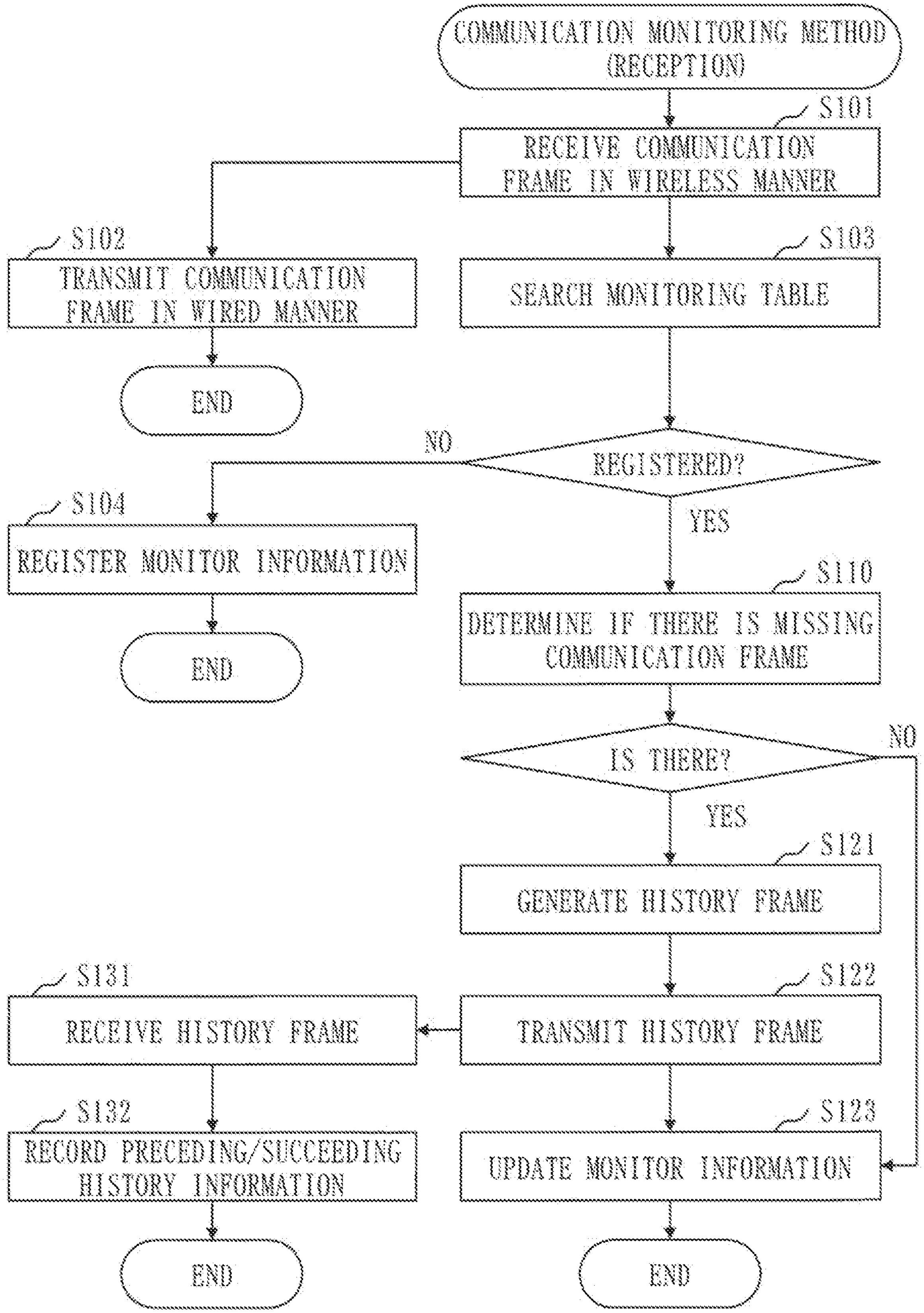
FIG. 8 is a flowchart of a communication monitoring method (reception) in Embodiment 1.

Back to FIG. 8, the description of step S103 will continue.

Monitor information in which the communication type 221 shows "reception" and a set of transmission source address 222 and destination address 223 coincides with a set of destination address 141 and transmission source address 142 will be referred to as "relevant monitor information".

If a communication time point 225 is set in the relevant monitor information, in other words, if relevant monitor information is registered with the monitoring table 220, the processing proceeds to step S110.

If a communication time point 225 is not set in the relevant monitor information, in other words, if the relevant monitor information is not registered with the monitoring table 220, the processing proceeds to step S104.

In step S104, the communication frame monitoring unit 214 registers the relevant monitor information with the monitoring table 220.

Specifically, the communication frame monitoring unit 214 sets a reception time point of the communication frame 130 in a field for the communication time point 225 of the relevant monitor information. Further, the communication frame monitoring unit 214 sets the period number 143 of the communication frame 130 in a field for the period number 226 of the relevant monitor information, and sets the sequence number 144 of the communication frame 130 in a field for the sequence number 227 of the relevant monitor information.

In step S110, the communication frame monitoring unit 214 determines if there is missing communication information 140 on a basis of the communication information 140 of a this-time communication frame 130 and the communication information 140 of a last-time communication frame 130.

The this-time communication frame 130 is a communication frame 130 that has been received this time in the wireless manner.

The last-time communication frame 130 is a communication frame 130 that was received last time in the wireless manner.

The communication information 140 of the last-time communication frame 130 corresponds to the relevant monitor information.

A missing communication frame 130 is a communication frame 130 that was unable to be received in the wireless manner before the this-time communication frame 130.

A determination method in step S110 will be described with referring to FIG. 10.

For example, the communication frame monitoring unit 214 performs determination under a condition (1) until a condition (7) sequentially. When one of the conditions (1) to (7) is satisfied, the communication frame monitoring unit 214 determines that there is a missing communication frame 130.

Note that "this-time period number" signifies the period number 143 of the this-time communication frame 130.

Note that "last-time period number" signifies the period number 226 of the relevant monitor information.

Note that "minimum number" is an initial value of the period number 143 and is fixed in advance.

Note that "maximum number" is a maximum value of the period number 143 and is fixed in advance.

Note that "this-time sequence number" signifies the sequence number 144 of the this-time communication frame 130.

Note that "last-time sequence number" signifies the sequence number 227 of the relevant monitor information.

Note that "top number" is an initial value of the sequence number 144 and is fixed in advance.

Note that "final number" signifies the final number 224 of the relevant monitor information.

The condition (1) is as follows. When both (1a) and (1b) are satisfied, the condition (1) is satisfied.

(1a) The this-time period number is the same as the last-time period number.

(1b) The this-time sequence number is larger than the last-time sequence number by 2 or more.

The condition (2) is as follows.

The this-time period number is larger than the last-time period number by 2 or more.

The condition (3) is as follows. When both (3a) and (3b) are satisfied, the condition (3) is satisfied.

(3a) The this-time period number is larger than the last-time period number by 1.

(3b) The last-time sequence number is smaller than the final number.

The condition (4) is as follows. When both (4a) and (4b) are satisfied, the condition (4) is satisfied.

(4a) The this-time period number is larger than the last-time period number by 1.

(4b) The this-time sequence number is not a top number.

The condition (5) is as follows. When both (5a) and (5b) are satisfied, the condition (5) is satisfied.

(5a) The last-time period number is a maximum number.

(5b) The this-time period number is neither a maximum number nor a minimum number.

The condition (6) is as follows. When all of (6a) to (6c) are satisfied, the condition (6) is satisfied.

(6a) The last-time period number is a maximum number.

(6b) The this-time period number is a minimum number.

(6c) The last-time sequence number is smaller than a final number.

The condition (7) is as follows. When all of (7a) to (7d) are satisfied, the condition (7) is satisfied.

(7a) The last-time period number is a maximum number.

(7b) The this-time period number is a minimum number.

(7c) The last-time sequence number is a final number.

(7d) The this-time sequence number is not a top number.

Back to FIG. 8, the description of step S110 will continue.

If it is determined that there is a missing communication frame 130, the processing proceeds to step S121.

If it is determined that there is no missing communication frame 130, the processing proceeds to step S123.

In step S121, the history frame generation unit 215 generates preceding/succeeding history information 240, and generates a history frame 230 by setting the preceding/succeeding history information 240.

Figure 11:
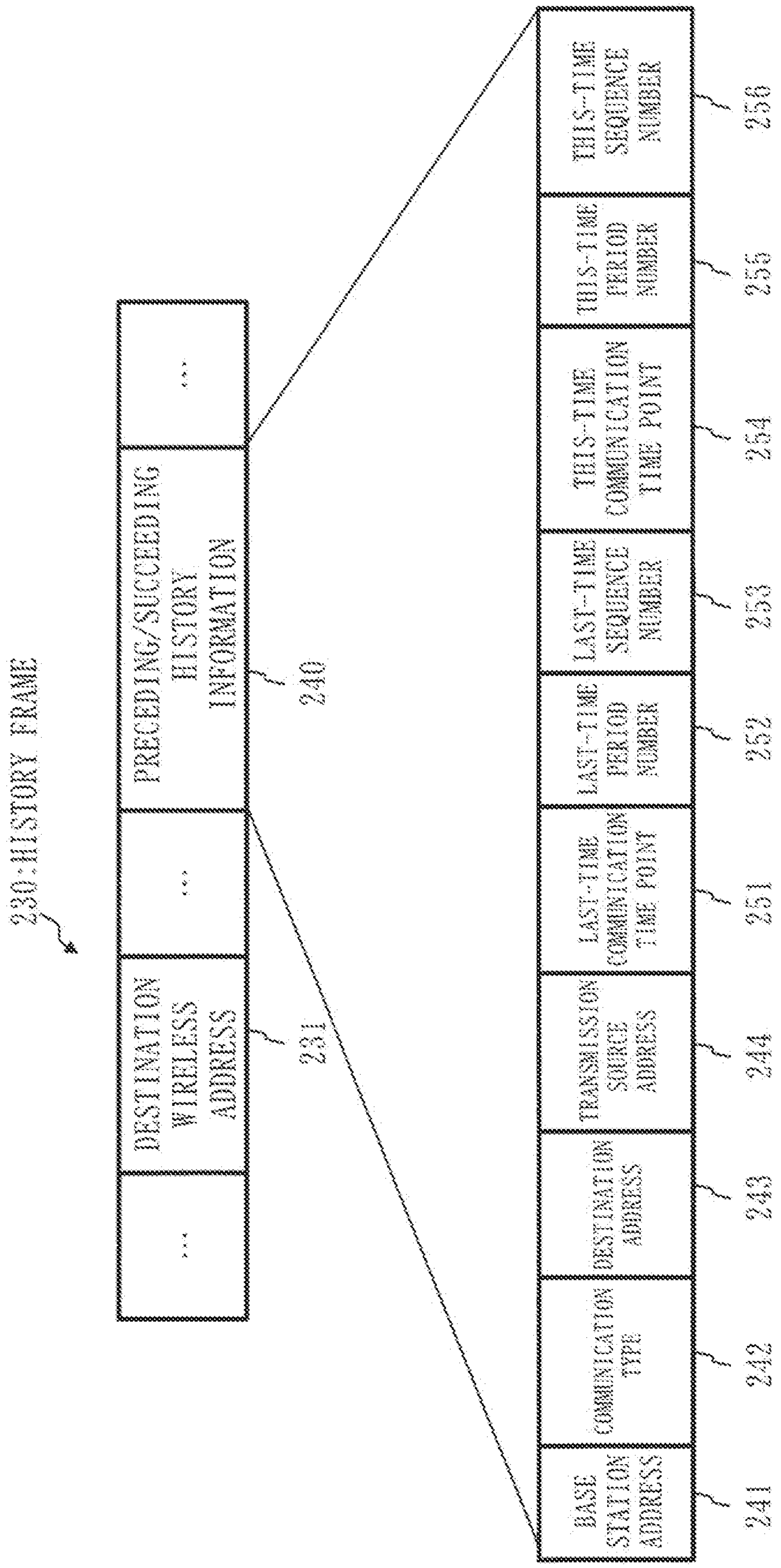
FIG. 11 is a configuration diagram of a history frame 230 in Embodiment 1.

The history frame 230 will be described with referring to FIG. 11.

The history frame 230 is a frame that contains the preceding/succeeding history information 240.

The preceding/succeeding history information 240 is communication history information of communication frames 130 received before and after the missing communication frame 130.

The history frame 230 contains a destination wireless address 231 and the preceding/succeeding history information 240.

The destination wireless address 231 is a wireless communication address of the base station 200 which the history management server 300 is connected to. Specifically, the destination wireless address 231 is a wireless communication address of the master base station 113.

The preceding/succeeding history information 240 contains a base station address 241, a communication type 242, a destination address 243, and a transmission source address 244.

The base station address 241 is the address of the base station 200 that has received the this-time communication frame 130.

The communication type 242 is the communication type of the this-time communication frame 130, and is the same as the communication type 221 of the relevant monitor information.

The destination address 243 is the same as the destination address 141 of the this-time communication frame 130.

The transmission source address 244 is the same as the transmission source address 142 of the this-time communication frame 130.

Further, the preceding/succeeding history information 240 contains a last-time communication time point 251, a last-time period number 252, a last-time sequence number 253, a this-time communication time point 254, a this-time period number 255, and a this-time sequence number 256.

The last-time communication time point 251 is the same as the communication time point 225 of the relevant monitor information.

The last-time period number 252 is the same as the period number 226 of the relevant monitor information.

The last-time sequence number 253 is the same as the sequence number 227 of the relevant monitor information.

The this-time communication time point 254 is a reception time point of the this-time communication frame 130.

The this-time period number 255 is the same as the period number 143 of the this-time communication frame 130.

The this-time sequence number 256 is the same as the sequence number 144 of the this-time communication frame 130.

Back to FIG. 8, the description will continue from step S122.

In step S122, the history frame generation unit 215 passes the history frame 230 to the transmission destination settling unit 212.

The transmission destination settling unit 212 accepts the history frame 230 and passes the history frame 230 to the wireless communication unit 211 or the wired communication unit 213.

Specifically, if the base station 200 is a slave base station 123, the transmission destination settling unit 212 sets a wireless communication address of the master base station 113 in a field for the destination wireless address 231 of the history frame 230. Then, the transmission destination settling unit 212 passes the history frame 230 to the wireless communication unit 211.

If the base station 200 is a master base station 113, the transmission destination settling unit 212 passes the history frame 230 to the wired communication unit 213.

When the history frame 230 is passed to the wireless communication unit 211, the wireless communication unit 211 accepts the history frame 230 and transmits the history frame 230 forward for the history management server 300 in the wireless manner.

When the history frame 230 is passed to the wired communication unit 213, the wired communication unit 213 accepts the history frame 230 and transmits the history frame 230 forward for the history management server 300 in the wired manner.

After step S122, the processing proceeds to step S123 and step S131.

In step S123, the communication frame monitoring unit 214 updates the relevant monitor information.

Specifically, the communication frame monitoring unit 214 overwrites the communication time point 225 of the relevant monitor information with the reception time point of the this-time communication frame 130. Further, the communication frame monitoring unit 214 overwrites the period number 226 of the relevant monitor information with the period number 143 of the this-time communication frame 130, and overwrites the sequence number 227 of the relevant monitor information with the sequence number 144 of the this-time communication frame 130.

In step S131, the history frame receiving unit 311 receives the history frame 230.

Specifically, the history frame receiving unit 311 receives the history frame 230 from the master base station 113 in the wired manner via the network hub 112.

In step S132, the history frame receiving unit 311 passes the history frame 230 to the history recording unit 312.

The history recording unit 312 accepts the history frame 230, acquires the preceding/succeeding history information 240 from the history frame 230, and records the preceding/succeeding history information 240 in the history file 391.

Figure 12:
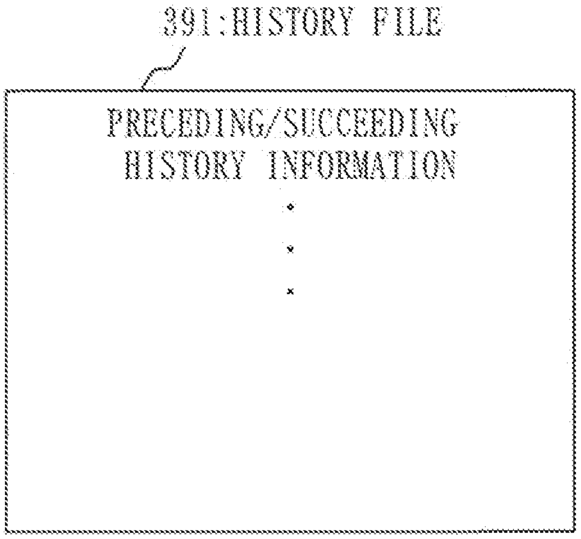
FIG. 12 is a diagram illustrating a history file 391 in Embodiment 1.

The history file 391 will be described with referring to FIG. 12.

The history file 391 is a file to be stored in the storage unit 390 so as to manage the preceding/succeeding history information 240. One or more pieces of preceding/succeeding history information 240 are recorded in the history file 391.

Figure 13:
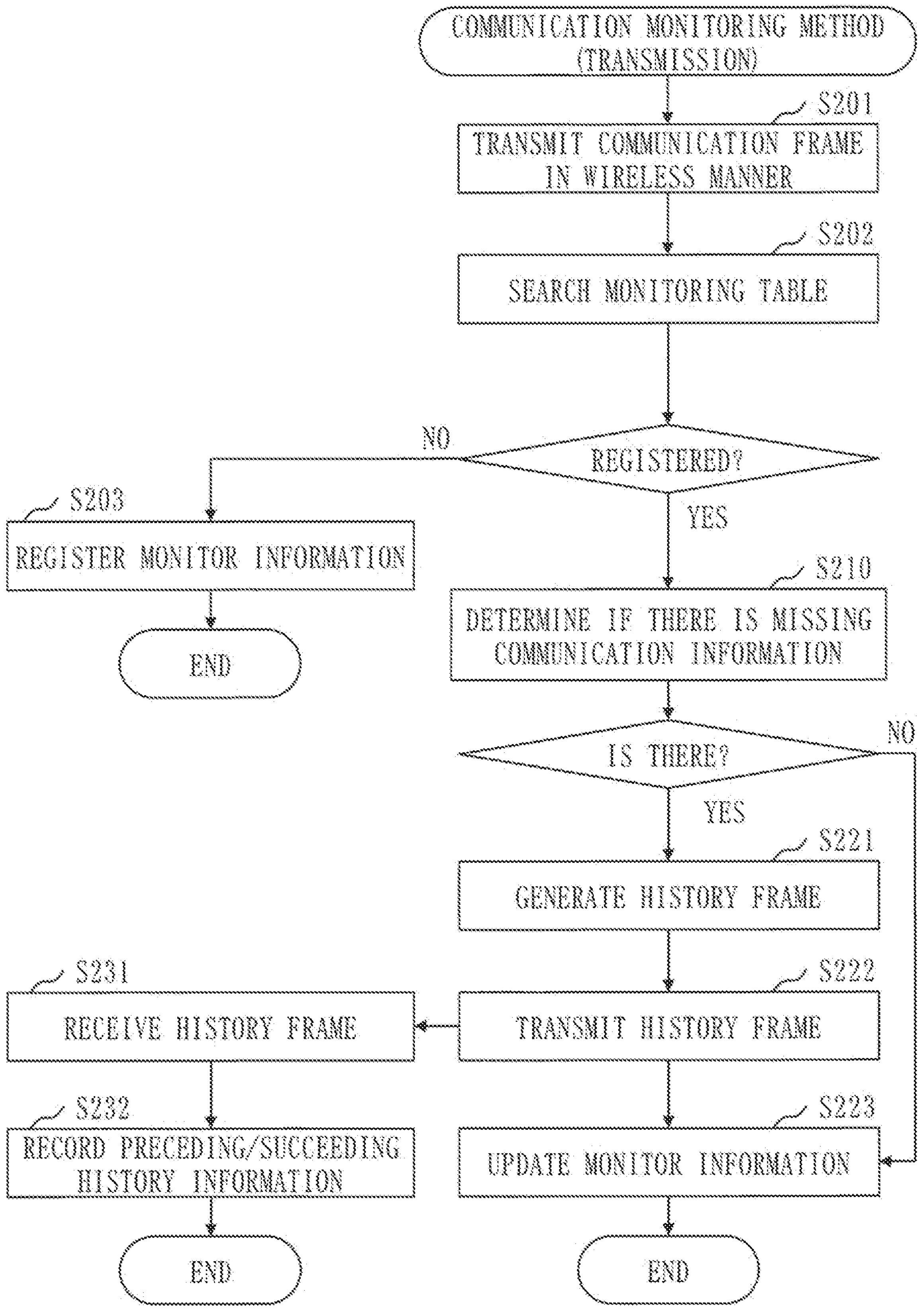
FIG. 13 is a flowchart of a communication monitoring method (transmission) in Embodiment 1.

A communication monitoring method (transmission) will be described with referring to FIG. 13.

The communication monitoring method (transmission) is a method for a case where the base station 200 has transmitted a communication frame 130.

In step S201, the wireless communication unit 211 transmits the communication frame 130 in the wireless manner.

The communication frame 130 is transmitted as follows.

First, the wired communication unit 213 receives the communication frame 130 in the wired manner.

Specifically, if the base station 200 is a slave base station 123, the wired communication unit 213 receives the communication frame 130 from a slave station 121 identified by the transmission source address 142 of the communication frame 130.

If the base station 200 is a master base station 113, the wired communication unit 213 receives the communication frame 130 from the master station 111.

Next, the wired communication unit 213 passes the communication frame 130 to the transmission destination settling unit 212. The transmission destination settling unit 212 accepts the communication frame 130.

Next, referring to the address table and the configuration file, the transmission destination settling unit 212 specifies a wireless communication address of the base station 200 connected in the wired manner to an address identified by the destination address 141, and sets the specified address in a field for the destination wireless address 131.

Next, the transmission destination settling unit 212 passes the communication frame 130 to the wireless communication unit 211. The wireless communication unit 211 accepts the communication frame 130.

Then, the wireless communication unit 211 transmits the communication frame 130 in the wireless manner.

Also, the wired communication unit 213 passes the communication frame 130 to the communication frame monitoring unit 214. Note that the destination wireless address 131 is not required.

In step S202, the communication frame monitoring unit 214 accepts the communication frame 130 and searches the monitoring table 220.

Step S202 is the same as step S103 except that the communication type 221 of the relevant monitor information shows "transmission".

If relevant monitor information is registered with the monitoring table 220, the processing proceeds to step S210.

If relevant monitor information is not registered with the monitoring table 220, the processing proceeds to step S203.

In step S203, the communication frame monitoring unit 214 registers relevant monitor information with the monitoring table 220.

Step S203 is the same as step S104.

In step S210, the communication frame monitoring unit 214 determines if there is missing communication information 140 on a basis of the communication information 140 of a this-time communication frame 130 and the communication information 140 of a last-time communication frame 130.

The this-time communication frame 130 is a communication frame 130 that has been transmitted this time in the wireless manner.

The last-time communication frame 130 is a communication frame 130 that was transmitted last time in the wireless manner.

The communication information 140 of the last-time communication frame 130 corresponds to the relevant monitor information.

A missing communication frame 130 is a communication frame 130 that was unable to be transmitted in the wireless manner before the this-time communication frame 130.

A determination method in step S210 is the same as the determination method in step S110.

If it is determined that there is a missing communication frame 130, the processing proceeds to step S221.

If it is determined that there is no missing communication frame 130, the processing proceeds to step S223.

In step S221, the history frame generation unit 215 generates preceding/succeeding history information 240, and generates a history frame 230 by setting the preceding/succeeding history information 240.

Step S221 is the same as step S121 except that a this-time communication time point 254 in the history frame 230 is a transmission time point of the this-time communication frame 130.

In step S222, the wireless communication unit 211 or the wired communication unit 213 transmits the history frame 230 forward for the history management server 300.

Step S222 is the same as step S122.

After step S222, the processing proceeds to step S223 and step S231.

In step S223, the communication frame monitoring unit 214 updates the relevant monitor information.

Step S223 is the same as step S123.

In step S231, the history frame receiving unit 311 receives the history frame 230.

Step S231 is the same as step S131.

In step S232, the history recording unit 312 acquires preceding/succeeding history information 240 from the history frame 230 and records the preceding/succeeding history information 240 in the history file 391.

Step S232 is the same as step S132.

Figure 14:
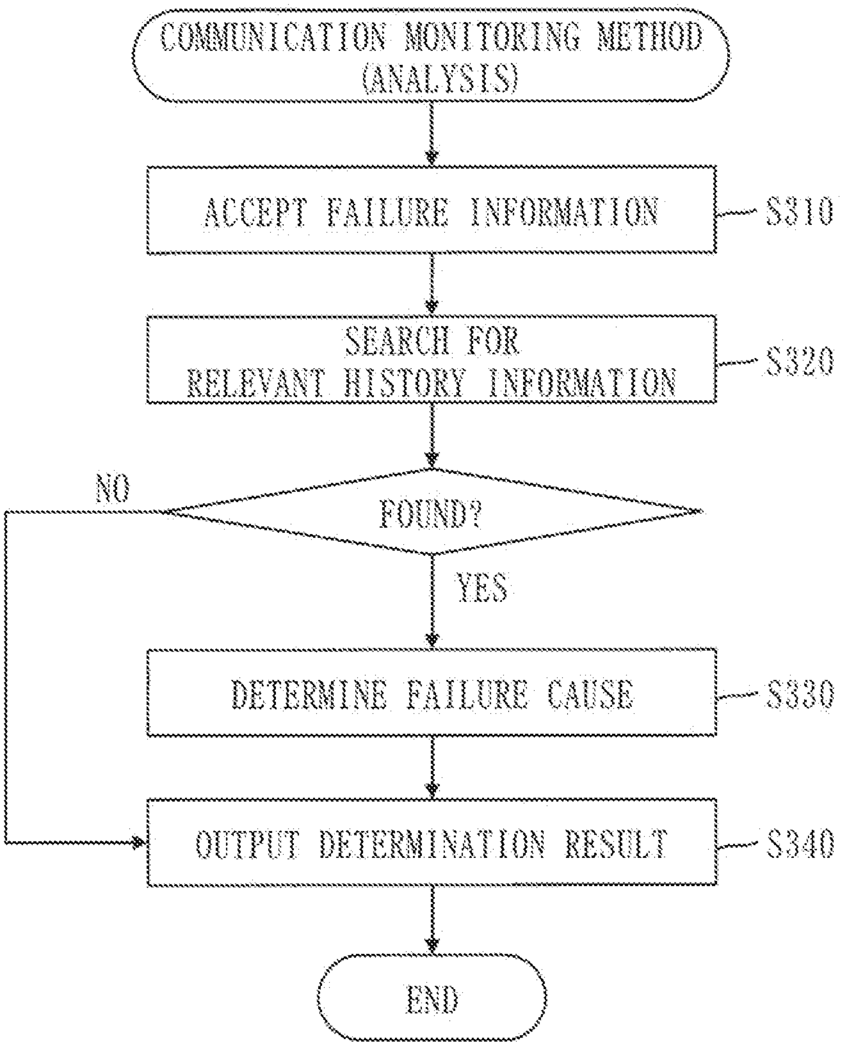
FIG. 14 is a flowchart of a communication monitoring method (analysis) in Embodiment 1.

A communication monitoring method (analysis) will be described with referring to FIG. 14.

The communication monitoring method (analysis) is a method of determining a cause of a system failure on a basis of the preceding/succeeding history information 240.

The system failure is a failure that occurs in a monitoring target system.

The monitoring target system is a system that is a target of monitoring by the communication monitoring system 100, and is provided with the master equipment 110 (excluding the history management server 300) and one or more slave equipments 120.

A specific example of the monitoring target system is a system that produces products and that is provided with one or more production equipments controlled by a master station 111 and one or more slave station 121. The production equipment is provided with one or more production devices.

In step S310, the information accepting unit 321 accepts failure information.

The failure information contains a time point (failure detection time point) at which a system failure was detected.

The failure information is accepted as follows.

When the system failure is detected, the failure information is inputted or transmitted to the history management server 300.

For example, when a person recognizes that the production equipment has stopped, the person inputs or transmits failure information to the history management server 300.

For example, the production device transmits failure information to the history management server 300 when the production device generates an alarm.

Then, the information accepting unit 321 accepts the inputted or transmitted failure information.

In step S320, the cause determination unit 322 searches for relevant history information from the history file 391 on a basis of the failure information.

The relevant history information is preceding/succeeding history information 240 indicating a last-time communication time point 251 within a certain period of time before the failure detection time point, or a this-time communication time point 254 within a certain period of time after the failure detection time point.

If relevant history information is found, the processing proceeds to step S330.

If relevant history information is not found, the cause determination unit 322 determines that the cause of the system failure is neither the master base station 113 nor the slave base station 123. Then, the processing proceeds to step S340.

In step S330, the cause determination unit 322 determines the cause of the system failure on a basis of the relevant history information and whether there is corresponding history information.

The corresponding history information is preceding/succeeding history information 240 corresponding to the relevant history information.

A determination method in step S330 will be described later.

In step S340, the result output unit 323 outputs a determination result about the factor of the system failure.

The determination method in step S330 will now be described with referring to FIGS. 15 to 21.

For example, the cause determination unit 322 performs determination under conditions (A) through (Q) in turn. When one of the conditions (A) to (Q) is satisfied, the cause determination unit 322 ends the determination.

If none of the conditions (A) to (Q) is satisfied, the cause determination unit 322 determines that the cause of the system failure is unclear.

Note that "relevant base station" signifies a base station 200 identified by the base station address 241 of the relevant history information.

Note that "relevant communication type" signifies the communication type 242 of the relevant history information.

Note that "relevant destination address" signifies the destination address 243 of the relevant history information.

Note that "partner slave station" signifies a slave station 121 identified by the relevant destination address. If the relevant destination address is a multicast address, the "partner slave station" signifies each slave station 121 belonging to a multicast group. If the relevant destination address is a broadcast address, the "partner slave station" signifies each slave station 121.

Note that "partner slave base station" signifies a slave base station 123 connected to the partner slave station in the wired manner.

Note that "relevant transmission source address" signifies the transmission source address 244 of the relevant history information.

Note that "relevant slave station" signifies a slave station 121 identified by the relevant transmission source address.

Note that "relevant slave base station" signifies a slave base station 123 connected to the relevant slave station in the wired manner.

In FIG. 15, the condition (A) and the condition (B) are conditions concerning unicast transmission from the slave station 121 to the master station 111.

The condition (A) is as follows. When all of (Aa) to (Ad) are satisfied, the condition (A) is satisfied.

(Aa) The relevant base station is a slave base station 123.

(Ab) The relevant communication type is "transmission".

(Ac) The relevant destination address is a unicast address.

If the relevant destination address is neither a multicast address nor a broadcast address, the cause determination unit 322 determines that the relevant destination address is a unicast address. Alternatively, if the relevant destination address is the address of the master station 111 or of a slave station 121, the cause determination unit 322 determines that the relevant destination address is a unicast address.

(Ad) Corresponding history information [A] is recorded in the history file 391.

The corresponding history information [A] is preceding/succeeding history information 240 that satisfies all of [A1] to [A4].

[A1] The base station address 241 is the address of the master base station 113.

[A2] The communication type 242 is "reception".

[A3] A set of destination address 243 and transmission source address 244 is the same as a set of destination address 243 of the relevant history information and transmission source address 244 of the relevant history information.

[A4] The this-time communication time point 254 is included between the last-time communication time point 251 of the relevant history information and the this-time communication time point 254 of the relevant history information.

If the condition (A) is satisfied, the cause determination unit 322 determines that the relevant slave station or a wired communication path between the relevant slave station and the relevant slave base station is the cause.

The condition (B) is as follows. When all of (Ba) to (Bd) are satisfied, the condition (B) is satisfied.

(Ba) The relevant base station is the master base station 113.

(Bb) The relevant communication type is "reception".

(Bc) The relevant destination address is a unicast address.

(Bd) Corresponding history information [B] is not recorded in the history file 391.

The corresponding history information [B] is preceding/succeeding history information 240 that satisfies all of [B1] to [B3].

[B1] The base station address 241 is the address of the relevant slave base station.

[B2] The communication type 242 is "transmission".

[B3] The this-time communication time point 254 is included between the last-time communication time point 251 of the relevant history information and the this-time communication time point 254 of the relevant history information.

If the condition (B) is satisfied, the cause determination unit 322 determines that wireless transmission from the relevant slave base station to the master base station 113 is the cause.

In FIG. 16, the condition (C) and the condition (D) are conditions concerning unicast transmission from the master station 111 to a slave station 121.

The condition (C) is as follows. When all of (Ca) to (Cd) are satisfied, the condition (C) is satisfied.

(Ca) The relevant base station is a slave base station 123.

(Cb) The relevant communication type is "reception".

(Cc) The relevant destination address is a unicast address.

(Cd) Corresponding history information [C] is recorded in the history file 391.

The corresponding history information [C] is preceding/succeeding history information 240 that satisfies all of [C1] to [C4].

[C1] The base station address 241 is the address of the master base station 113.

[C2] The communication type 242 is "transmission".

[C3] The set of destination address 243 and transmission source address 244 is the same as the set of destination address 243 of the relevant history information and transmission source address 244 of the relevant history information.

[C4] The this-time communication time point 254 is included between the last-time communication time point 251 of the relevant history information and the this-time communication time point 254 of the relevant history information.

If the condition (C) is satisfied, the cause determination unit 322 determines that the master station 111 or a wired communication path between the master station 11 and the master base station 113 is the cause.

The condition (D) is as follows. When all of (Da) to (Dd) are satisfied, the condition (D) is satisfied.

(Da) The relevant base station is a slave base station 123.

(Db) The relevant communication type is "reception".

(Dc) The relevant destination address is a unicast address.

(Dd) Corresponding history information [D] is not recorded in the history file 391.

The corresponding history information [D] is preceding/succeeding history information 240 that satisfies all of [D1] to [D4].

[D1] The base station address 241 is the address of the master base station 113.

[D2] The communication type 242 is "transmission".

[D3] The set of destination address 243 and transmission source address 244 is the same as the set of destination address 243 of the relevant history information and transmission source address 244 of the relevant history information.

[D4] The this-time communication time point 254 is included between the last-time communication time point 251 of the relevant history information and the this-time communication time point 254 of the relevant history information.

If the condition (D) is satisfied, the cause determination unit 322 determines that wireless transmission from the master base station 113 to a slave base station 123 is the cause.

In FIG. 17, the condition (E), the condition (F), and the condition (G) are conditions concerning unicast transmission from a slave station 121 to a partner slave station 121 via wireless communication.

The condition (E) is as follows. When all of (Ea) to (Ed) are satisfied, the condition (E) is satisfied.

(Ea) The relevant base station is a slave base station 123.

(Eb) The relevant communication type is "transmission".

(Ec) The relevant destination address is a unicast address.

(Ed) Corresponding history information [E] is recorded in the history file 391.

The corresponding history information [E] is preceding/succeeding history information 240 that satisfies all of [E1] to [E4].

[E1] The base station address 241 is the address of a partner slave base station.

[E2] The communication type 242 is "reception".

[E3] The set of destination address 243 and transmission source address 244 is the same as the set of destination address 243 of the relevant history information and transmission source address 244 of the relevant history information.

[E4] The this-time communication time point 254 is included between the last-time communication time point 251 of the relevant history information and the this-time communication time point 254 of the relevant history information.

If the condition (E) is satisfied, the cause determination unit 322 determines that the relevant slave station or a wired communication path between the relevant slave station and the relevant slave base station is the cause.

The condition (F) is as follows. When all of (Fa) to (Fc) are satisfied and (Fd) or (Fe) is satisfied, the condition (F) is satisfied.

(Fa) The relevant base station is a slave base station 123.

(Fb) The relevant communication type is "reception".

(Fc) The relevant destination address is a unicast address.

(Fd) Corresponding history information [F] is not recorded in the history file 391.

(Fe) Corresponding history information [F'] is recorded in the history file 391.

The corresponding history information [F] is preceding/succeeding history information 240 that satisfies all of [F1] to [F3].

[F1] The base station address 241 is the address of the relevant slave base station.

[F2] The communication type 242 is "transmission".

[F3] The this-time communication time point 254 is included between the last-time communication time point 251 of the relevant history information and the this-time communication time point 254 of the relevant history information.

The corresponding history information [F'] is preceding/succeeding history information 240 that satisfies all of [F'1] to [F'4].

[F'1] The base station address 241 is the address of the master base station 113.

[F'2] The communication type 242 is "transmission".

[F'3] The set of destination address 243 and transmission source address 244 is the same as the set of destination address 243 of the relevant history information and transmission source address 244 of the relevant history information.

[F'4] The this-time communication time point 254 is included between the last-time communication time point 251 of the relevant history information and the this-time communication time point 254 of the relevant history information.

If the condition (F) is satisfied, the cause determination unit 322 determines that wireless transmission from the relevant slave station to the master base station 113 is the cause.

The condition (G) is as follows. When all of (Ga) to (Gc) are satisfied and (Gd) or (Ge) is satisfied, the condition (G) is satisfied.

(Ga) The relevant base station is a slave base station 123.

(Gb) The relevant communication type is "reception".

(Gc) The relevant destination address is a unicast address.

(Gd) Corresponding history information [G] is not recorded in the history file 391.

(Ge) Corresponding history information [G'] is not recorded in the history file 391.

The corresponding history information [G] is preceding/succeeding history information 240 that satisfies all of [G1] to [G3].

[G1] The base station address 241 is the address of the relevant slave base station.

[G2] The communication type 242 is "transmission".

[G3] The this-time communication time point 254 is included between the last-time communication time point 251 of the relevant history information and the this-time communication time point 254 of the relevant history information.

The corresponding history information [G'] is preceding/succeeding history information 240 that satisfies all of [G'1] to [G'3].

[G'1] The base station address 241 is the address of the master base station 113.

[G'2] The set of destination address 243 and transmission source address 244 is the same as the set of destination address 243 of the relevant history information and transmission source address 244 of the relevant history information.

[G'3] The this-time communication time point 254 is included between the last-time communication time point 251 of the relevant history information and the this-time communication time point 254 of the relevant history information.

If the condition (G) is satisfied, the cause determination unit 322 determines that wireless transmission from the master base station 113 to the partner slave base station is the cause.

In FIG. 18, the condition (H), the condition (I), and the condition (J) are conditions concerning multicast transmission from a slave station 121 to a plurality of stations.

The condition (H) is as follows. When all of (Ha) to (Hd) are satisfied, the condition (H) is satisfied.

(Ha) The relevant base station is a slave base station 123.

(Hb) The relevant communication type is "transmission".

(Hc) The relevant destination address is a multicast address.

(Hd) Corresponding history information [H] is recorded in the history file 391.

The corresponding history information [H] is preceding/succeeding history information 240 that satisfies all of [H1] to [H4].

[H1] The base station address 241 is the address of the master base station 113.

[H2] The communication type 242 is "reception".

[H3] The set of destination address 243 and transmission source address 244 is the same as the set of destination address 243 (multicast address) of the relevant history information and transmission source address 244 of the relevant history information.

[H4] The this-time communication time point 254 is included between the last-time communication time point 251 of the relevant history information and the this-time communication time point 254 of the relevant history information.

If the condition (H) is satisfied, the cause determination unit 322 determines that the relevant slave station or a wired communication path between the relevant slave station and the relevant slave base station is the cause.

The condition (I) is as follows. When all of (Ia) to (Id) are satisfied, the condition (I) is satisfied.

(Ia) The relevant base station is the master base station 113.

(Ib) The relevant communication type is "reception".

(Ic) The relevant destination address is a multicast address.

(Id) Corresponding history information [I] is not recorded in the history file 391.

The corresponding history information [I] is preceding/succeeding history information 240 that satisfies all of [I1] to [I3].

[I1] The base station address 241 is the address of the relevant slave base station.

[I2] The communication type 242 is "transmission".

[I3] The this-time communication time point 254 is included between the last-time communication time point 251 of the relevant history information and the this-time communication time point 254 of the relevant history information.

If the condition (I) is satisfied, the cause determination unit 322 determines that wireless transmission from the relevant slave base station to the master base station 113 is the cause.

The condition (J) is as follows. When all of (Ja) to (Jd) are satisfied, the condition (J) is satisfied.

(Ja) The relevant base station is a slave base station 123.

(Jb) The relevant communication type is "reception".

(Jc) The relevant destination address is a multicast address.

(Jd) Corresponding history information [J] and corresponding history information [J'] are not recorded in the history file 391.

The corresponding history information [J] is preceding/succeeding history information 240 that satisfies all of [J1], [J2], and [J3].

The corresponding history information [J'] is preceding/succeeding history information 240 that satisfies all of [J'1], [J2], and [J3].

[J1] The base station address 241 is the address of the relevant slave base station.

[J'1] The base station address 241 is the address of the master base station 113.

[J2] The communication type 242 is "transmission".

[J3] The this-time communication time point 254 is included between the last-time communication time point 251 of the relevant history information and the this-time communication time point 254 of the relevant history information.

If the condition (J) is satisfied, the cause determination unit 322 determines that wireless transmission from the master base station 113 to the relevant slave base station is the cause.

In FIG. 19, the condition (K) and the condition (L) are conditions concerning multicast transmission from the master station 111 to a plurality of stations.

The condition (K) is as follows. When all of (Ka) to (Kd) are satisfied, the condition (K) is satisfied.

(Ka) The relevant base station is the master base station 113.

(Kb) The relevant communication type is "transmission".

(Kc) The relevant destination address is a multicast address.

(Kd) Corresponding history information [K] of each of all partner slave base stations is recorded in the history file 391.

The corresponding history information [K] is preceding/succeeding history information 240 that satisfies all of [K1] to [K4].

[K1] The base station address 241 is the address of the partner slave base station.

[K2] The communication type 242 is "reception".

[K3] The set of destination address 243 and transmission source address 244 is the same as the set of destination address 243 (multicast address) of the relevant history information and transmission source address 244 of the relevant history information.

[K4] The this-time communication time point 254 is included between the last-time communication time point 251 of the relevant history information and the this-time communication time point 254 of the relevant history information.

If the condition (K) is satisfied, the cause determination unit 322 determines that the master station 111 or a wired communication path between the master station 111 and the master base station 113 is the cause.

The condition (L) is as follows. When all of (La) to (Ld) are satisfied, the condition (L) is satisfied.

(La) The relevant base station is a slave base station 123.

(Lb) The relevant communication type is "reception".

(Lc) The relevant destination address is a multicast address.

(Ld) Corresponding history information [L] is not recorded in the history file 391.

The corresponding history information [L] is preceding/succeeding history information 240 that satisfies all of [L1] to [L4].

[L1] the base station address 241 is the address of the master base station 113.

[L2] The communication type 242 is "transmission".

[L3] The set of destination address 243 and transmission source address 244 is the same as the set of destination address 243 (multicast address) of the relevant history information and transmission source address 244 of the relevant history information.

[L4] The this-time communication time point 254 is included between the last-time communication time point 251 of the relevant history information and the this-time communication time point 254 of the relevant history information.

If the condition (L) is satisfied, the cause determination unit 322 determines that wireless transmission from the master base station 113 to the partner slave base station is the cause.

In FIG. 20, the condition (M), the condition (N), and the condition (O) are conditions concerning broadcast transmission from the slave station 121 to all stations.

The condition (M) is as follows. When all of (Ma) to (Md) are satisfied, the condition (M) is satisfied.

(Ma) The relevant base station is a slave base station 123.

(Mb) The relevant communication type is “transmission”.

(Mc) The relevant destination address is a broadcast address.

(Md) Corresponding history information [M] is recorded in the history file 391.

The corresponding history information [M] is preceding/succeeding history information 240 that satisfies all of [M1] to [M4].

[M1] The base station address 241 is the address of the master base station 113.

[M2] The communication type 242 is “reception”.

[M3] The set of destination address 243 and transmission source address 244 is the same as the set of destination address 243 (broadcast address) of the relevant history information and transmission source address 244 of the relevant history information.

[M4] The this-time communication time point 254 is included between the last-time communication time point 251 of the relevant history information and the this-time communication time point 254 of the relevant history information.

If the condition (M) is satisfied, the cause determination unit 322 determines that the relevant slave station or a wired communication path between the relevant slave station and the relevant slave base station is the cause.

The condition (N) is as follows. When all of (Na) to (Nd) are satisfied, the condition (N) is satisfied.

(Na) The relevant base station is the master base station 113.

(Nb) The relevant communication type is “reception”.

(Nc) The relevant destination address is a broadcast address.

(Nd) Corresponding history information [N] is not recorded in the history file 391.

The corresponding history information [N] is preceding/succeeding history information 240 that satisfies all of [N1] to [N3].

[N1] The base station address 241 is the address of the relevant slave base station.

[N2] The communication type 242 is “transmission”.

[N3] The this-time communication time point 254 is included between the last-time communication time point 251 of the relevant history information and the this-time communication time point 254 of the relevant history information.

If the condition (N) is satisfied, the cause determination unit 322 determines that wireless transmission from the relevant slave base station to the master base station 113 is the cause.

The condition (O) is as follows. When all of (Oa) to (Od) are satisfied, the condition (O) is satisfied.

(Oa) The relevant base station is a slave base station 123.

(Ob) The relevant communication type is “reception”.

(Oc) The relevant destination address is a broadcast address.

(Od) Corresponding history information 101 and corresponding history information [O'] are not recorded in the history file 391.

The corresponding history information [O] is preceding/succeeding history information 240 that satisfies all of [O1], [O2], and [O3].

The corresponding history information [O] is preceding/succeeding history information 240 that satisfies all of [O1], [O2], and [O3].

[O1] The base station address 241 is the address of the relevant slave base station.

[O'1] The base station address 241 is the address of the master base station 113.

[O2] The communication type 242 is “transmission”.

[O3] The this-time communication time point 254 is included between the last-time communication time point 251 of the relevant history information and the this-time communication time point 254 of the relevant history information.

If the condition (O) is satisfied, the cause determination unit 322 determines that wireless transmission from the master base station 113 to the relevant slave base station is the cause.

In FIG. 21, the condition (P) and the condition (Q) are conditions concerning broadcast transmission from the master station 111 to all stations.

The condition (P) is as follows. When all of (Pa) to (Pd) are satisfied, the condition (P) is satisfied.

(Pa) The relevant base station is the master base station 113.

(Pb) The relevant communication type is “transmission”.

(Pc) The relevant destination address is a broadcast address.

(Pd) Individual corresponding history information [P] of all partner slave base stations is recorded in the history file 391.

The corresponding history information [P] is preceding/succeeding history information 240 that satisfies all of [P1] to [P4].

[P1] The base station address 241 is the address of the partner slave base station.

[P2] The communication type 242 is “reception”.

[P3] The set of destination address 243 and transmission source address 244 is the same as the set of destination address 243 (broadcast address) of the relevant history information and transmission source address 244 of the relevant history information.

[P4] The this-time communication time point 254 is included between the last-time communication time point 251 of the relevant history information and the this-time communication time point 254 of the relevant history information.

If the condition (P) is satisfied, the cause determination unit 322 determines that the master station 111 or a wired communication path between the master station 111 and the master base station 113 is the cause.

The condition (Q) is as follows. When all of (Qa) to (Qd) are satisfied, the condition (Q) is satisfied.

(Qa) The relevant base station is a slave base station 123.

(Qb) The relevant communication type is “reception”.

(Qc) The relevant destination address is a broadcast address.

(Qd) Corresponding history information [Q] is not recorded in the history file 391.

The corresponding history information [Q] is preceding/succeeding history information 240 that satisfies all of [Q1] to [Q4].

[Q1] The base station address 241 is the address of the master base station 113.

[Q2] The communication type 242 is "transmission".

[Q3] The set of destination address 243 and transmission source address 244 is the same as the set of destination address 243 (broadcast address) of the relevant history information and transmission source address 244 of the relevant history information.

[Q4] The this-time communication time point 254 is included between the last-time communication time point 251 of the relevant history information and the this-time communication time point 254 of the relevant history information.

If the condition (Q) is satisfied, the cause determination unit 322 determines that wireless transmission from the master base station 113 to the partner slave base station is the cause.

Effect of Embodiment 1

In Embodiment 1, only minimum communication history information (preceding/succeeding history information 240) necessary for failure cause analysis is stored. Therefore, a storage capacity of the communication history information and a transmission frequency of the communication history can be kept to a minimum.

In Embodiment 1, missing of the communication frame 130 is monitored per transmission source device and per transmission destination device, and relevant communication history information (preceding/succeeding history information 240) of only a portion where a communication failure is likely to have occurred is stored. This can reduce the capacity necessary for storage, and can further reduce a time required for analysis.

According to Embodiment 1, missing of the communication frame 130 is detected in each of wireless transmission, wireless reception, and wired reception, and only communication history information (preceding/succeeding history information 240) before and after occurrence of the missing is recorded in the history file 391. Hence, communication history information in an amount that is necessary and sufficient for communication failure analysis is stored, thereby reducing the storage amount of the communication history information.

In Embodiment 1, it is possible to discriminate, only by stored communication history information, a case where a communication frame 130 is missing in wireless communication, since the base station 200 does not receive the communication frame 130 via wired communication from the master station 111 or the slave station 121 as the transmission source. Therefore, it becomes easy to isolate a failure cause.

In Embodiment 1, missing of a communication frame 130 can be detected correctly even if the final number of the sequence number differs depending on the slave station 121.

In Embodiment 1, the master base station 113 or the slave base station 123 sends the preceding/succeeding history information 240 to the history management server 300 only when missing in wireless reception or wireless transmission is detected. Therefore, a communication band of cyclic data transfer is not narrowed.

Supplement to Embodiment 1

The history management server 300 may be built in the master base station 113 or a slave base station 123.

Figure 22:
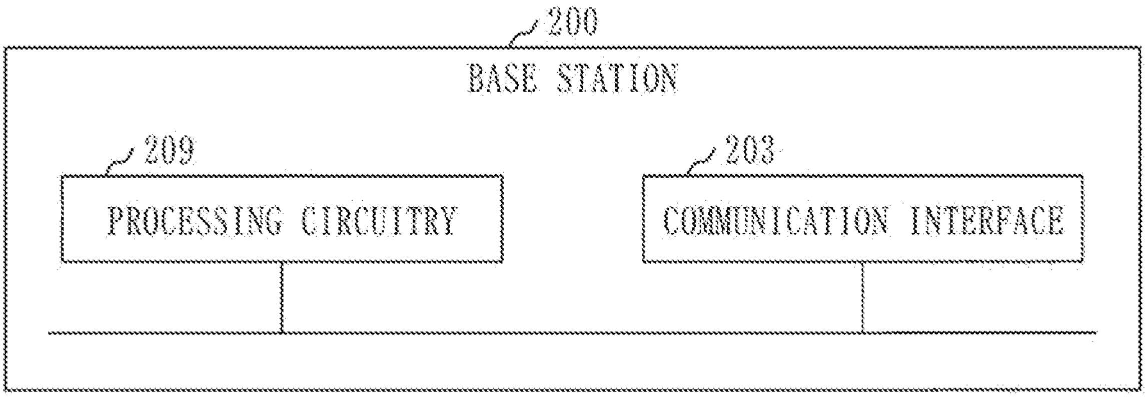
FIG. 22 is a hardware configuration diagram of the base station 200 in Embodiment 1.

A hardware configuration of the base station 200 will be described with referring to FIG. 22.

The base station 200 is provided with processing circuitry 209.

The processing circuitry 209 is hardware that implements the wireless communication unit 211, the transmission destination settling unit 212, the wired communication unit 213, the communication frame monitoring unit 214, and the history frame generation unit 215.

The processing circuitry 209 may be dedicated hardware, or may be a processor 201 that runs the program stored in the memory 202.

If the processing circuitry 209 is dedicated hardware, the processing circuitry 209 is one or a combination of, for example, a single circuit, a composite circuit, a programmed processor, a parallel-programmed processor, an ASIC, and an FPGA.

Note that ASIC stands for Application Specific Integrated Circuit.

Note that FPGA stands for Field Programmable Gate Array.

The base station 200 may be provided with a plurality of processing circuitry that substitute for the processing circuitry 209.

In the processing circuitry 209, some functions may be implemented by dedicated hardware, and the remaining functions may be implemented by software or firmware.

In this manner, the functions of the base station 200 can be implemented by one or a combination of hardware, software, and firmware.

Figure 23:
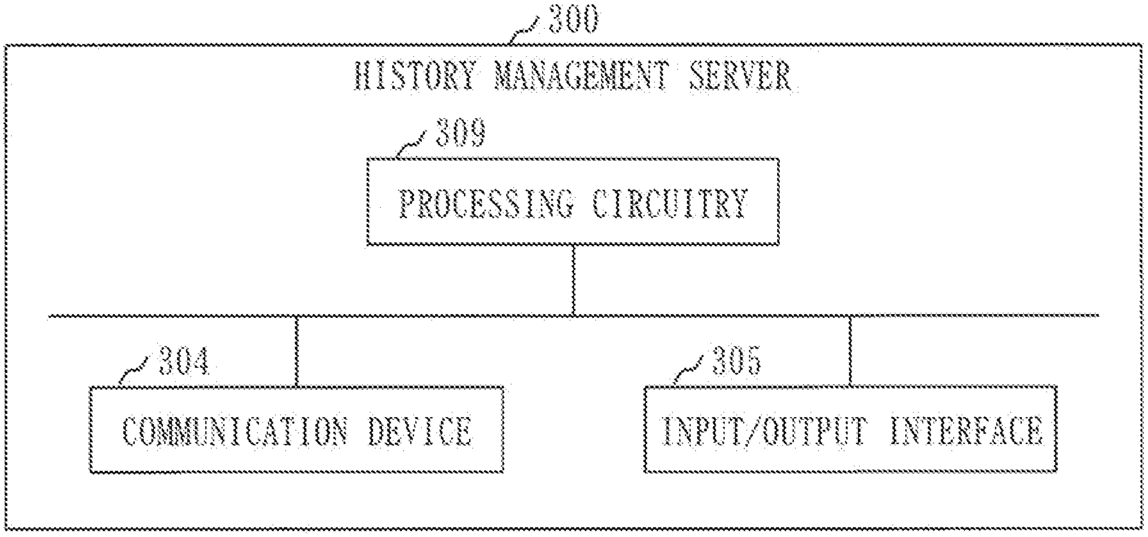
FIG. 23 is a hardware configuration diagram of the history management server 300 in Embodiment 1.

A hardware configuration of the history management server 300 will be described with referring to FIG. 23.

The history management server 300 is provided with processing circuitry 309.

The processing circuitry 309 is hardware that implements the history frame receiving unit 311, the history recording unit 312, the information accepting unit 321, the cause determination unit 322, and the result output unit 323.

The processing circuitry 309 may be dedicated hardware, or may be a processor 301 that runs the program stored in the memory 302.

If the processing circuitry 309 is dedicated hardware, the processing circuitry 309 is one or a combination of, for example, a single circuit, a composite circuit, a programmed processor, a parallel-programmed processor, an ASIC, and an FPGA.

The history management server 300 may be provided with a plurality of processing circuitry that substitute for the processing circuitry 309.

In the processing circuitry 309, some functions may be implemented by dedicated hardware, and the remaining functions may be implemented by software or firmware.

In this manner, the functions of the history management server 300 can be implemented by one or a combination of hardware, software, and firmware.

Embodiment 1 is an exemplification of a preferred mode, and is not intended to limit the technical scope of the present disclosure. Embodiment 1 may be practiced partly, or may be practiced in combination with another mode. The procedures described with using flowcharts and so on may be changed appropriately.

The term "unit" being an element of each of the base station 200 and the history management server 300 may be replaced by "process". "stage", "circuit", or "circuitry".

REFERENCE SIGNS LIST

100: communication monitoring system; 110: master equipment; 111: master station; 112: network hub; 113:

master base station; 120: slave equipment; 121: slave station; 122: network hub; 123: slave base station; 130: communication frame; 131: destination wireless address; 132: payload; 140: communication information; 141: destination address; 142: transmission source address; 143: period number; 144: sequence number; 200: base station; 201: processor; 202: memory; 203: communication interface; 209: processing circuitry; 211: wireless communication unit; 212: transmission destination settling unit; 213: wired communication unit; 214: communication frame monitoring unit; 215: history frame generation unit; 220: monitoring table; 221: communication type; 222: transmission source address; 223: destination address; 224: final number; 225: communication time point; 226: period number; 227: sequence number; 230: history frame; 231: destination wireless address; 240: preceding/succeeding history information; 241: base station address; 242: communication type; 243: destination address; 244: transmission source address; 251: last-time communication time point; 252: last-time period number; 253: last-time sequence number; 254: this-time communication time point; 255: this-time period number; 256: this-time sequence number; 290: storage unit; 300: history management server; 301: processor; 302: memory; 303: auxiliary storage device; 304: communication device; 305: input/output interface; 309: processing circuitry; 311: history frame receiving unit; 312: history recording unit; 321: information accepting unit; 322: cause determination unit; 323: result output unit; 390: storage unit; 391: history file.

The invention claimed is:

1. A communication monitoring system comprising:

a master base station connected to a master station in a wired manner;

a slave base station connected to a slave station in the wired manner, the slave base station configured to communicate a communication frame communicated from the slave station to the master station via the master base station in a wireless manner; and a history management server connected to the master base station and configured to record, as preceding and succeeding history information, communication history information of the communication frame communicated by each of the master base station and the slave base station before and after a missing communication frame, wherein the master station and the slave station each communicate an individually set, fixed number of communication frames in a cyclic period, wherein the communication frame contains, as communication information, a sequence number and a period number, the sequence number indicating an order in the cyclic period, the period number incrementing each time the cyclic period passes, wherein at least one of the master base station and the slave base station determines, upon communication of each communication frame in the wireless manner, if there is the missing communication frame on a basis of the communication information of a this-time communication frame and the communication information of a last-time communication frame, the this-time communication frame being communicated after the last-time communication frame, and in response to the determination by the at least one of the master base station and the slave base station that there is the missing communication frame, the at least one of the master base station and the slave base station transmits communication history information of the last-time communication frame and of the this-time communication frame to the history management server, as the preceding and succeeding history information.

2. The communication monitoring system according to claim 1, wherein the period number starts with a minimum number, ends with a maximum number, and after reaching the maximum number, returns to the minimum number, and wherein the sequence number starts with a top number, ends with a final number corresponding to the fixed number, and each time the cyclic period passes, returns to the top number.

3. The communication monitoring system according to claim 2, wherein the master base station and the slave base station determine that there is a missing communication frame when the period number of the this-time communication frame is the same as the period number of the last-time communication frame and the sequence number of the this-time communication frame is larger than the sequence number of the last-time communication frame by 2 or more.

4. The communication monitoring system according to claim 2, wherein the master base station and the slave base station determine that there is a missing communication frame when the period number of the this-time communication frame is larger than the period number of the last-time communication frame by 2 or more.

5. The communication monitoring system according to claim 2, wherein the master base station and the slave base station determine that there is a missing communication frame when the period number of the this-time communication frame is larger than the period number of the last-time communication frame by 1 and the sequence number of the last-time communication frame is smaller than the final number, the final number being higher than the top number and a maximum value in a set including all the sequence numbers.

6. The communication monitoring system according to claim 2, wherein the master base station and the slave base station determine that there is a missing communication frame when the period number of the this-time communication frame Is larger than the period number of the last-time communication frame by 1 and the sequence number of the this-time communication frame is not the top number.

7. The communication monitoring system according to claim 2, wherein the master base station and the slave base station determine that there is a missing communication frame when the period number of the last-time communication frame is the maximum number and the period number of the this-time communication frame is neither the maximum number nor the minimum number.

8. The communication monitoring system according to claim 2, wherein the master base station and the slave base station determine that there is a missing communication frame when the period number of the last-time communication frame is the maximum number, the period number of the this-time communication frame is the minimum number, and the sequence number of the last-time communication frame is smaller than the final number, the final number being higher than the top number and a maximum value in a set including all the sequence numbers.

9. The communication monitoring system according to claim 2, wherein the master base station and the slave base station determine that there is a missing communication frame when the period number of the last-time communication frame is the maximum number, the period number of the this-time communication frame is the minimum number, the sequence number of the last-time communication frame is the final number, and the sequence number of the this-time communication frame is not the top number.

10. The communication monitoring system according to claim 1, wherein the history management server determines a failure cause on a basis of relevant history information being the preceding and succeeding history information of communication frames received before and after a failure detection time point, and on a basis of whether there is corresponding history information being the preceding and succeeding history information corresponding to the relevant history information.

11. A base station used as the master base station or the slave base station in the communication monitoring system according to claim 1.

12. The history management server used in the communication monitoring system according to claim 1.

13. A communication monitoring method by a communication monitoring system, the communication monitoring system comprising:

a master base station connected to a master station in a wired manner;

a slave base station connected to a slave station in the wired manner, the slave base station configured to communicate a communication frame communicated from the slave station to the master station via the master base station in a wireless manner; and a history management server connected to the master base station and configured to record, as preceding and succeeding history information, communication history information of the communication frame communicated by each of the master base station and the slave base station before and after a missing communication frame, wherein the master station and the slave station each communicate an individually set, fixed number of communication frames in a cyclic period, wherein the communication frame contains, as communication information, a sequence number and a period number, the sequence number indicating an order in the cyclic period, the period number incrementing each time the cyclic period passes, and wherein the method comprises:

determining, by at least one of the master base station and the slave base station, upon communication of each communication frame in the wireless manner, if there is the missing communication frame on a basis of the communication information of a this-time communication frame and the communication information of a last-time communication frame, the this-time communication frame being communicated after the last-time communication frame, and in response to the determination by the at least one of the master base station and the slave base station that there is the missing communication frame, transmitting, by at least one of the master base station and the slave base station, communication history information of the last-time communication frame and of the this-time communication frame to the history management server, as the preceding and succeeding history information.

* * * * *